US008463625B1

(12) United States Patent
Owen

(10) Patent No.: US 8,463,625 B1
(45) Date of Patent: Jun. 11, 2013

(54) SYSTEM, METHOD AND COMPUTER PROGRAM PRODUCT FOR FACILITATING INFORMED DECISIONS RELATING TO THE FAIR SHARING OF THE COSTS OF INSURANCE BETWEEN A GROUP AND A THIRD PARTY

(76) Inventor: Daniel L. Owen, Los Altos, CA (US)

( * ) Notice: Subject to any disclaimer, the term of this patent is extended or adjusted under 35 U.S.C. 154(b) by 399 days.

(21) Appl. No.: 12/790,717

(22) Filed: May 28, 2010

Related U.S. Application Data

(63) Continuation-in-part of application No. 11/336,070, filed on Jan. 20, 2006, now Pat. No. 8,095,392.

(60) Provisional application No. 60/646,186, filed on Jan. 20, 2005.

(51) Int. Cl.
*G06Q 40/00* (2012.01)
(52) U.S. Cl.
USPC ............................................................ 705/4
(58) Field of Classification Search
USPC ............................................................ 705/4
See application file for complete search history.

(56) References Cited

U.S. PATENT DOCUMENTS

| | | | |
|---|---|---|---|
| 5,478,989 A | 12/1995 | Shepley | 235/375 |
| 5,537,590 A | 7/1996 | Amado | 395/600 |
| 5,592,375 A | 1/1997 | Salmon et al. | 395/207 |
| 5,874,955 A | 2/1999 | Rogowitz et al. | 345/339 |
| 5,940,807 A | 8/1999 | Purcell | 705/26 |
| 6,012,051 A | 1/2000 | Sammon, Jr. et al. | 706/52 |
| 6,044,362 A | 3/2000 | Neely | 705/34 |
| 6,119,101 A | 9/2000 | Peckover | 705/26 |

(Continued)

FOREIGN PATENT DOCUMENTS
WO WO0043935 7/2000

OTHER PUBLICATIONS

Final Office Action from U.S. Appl. No. 11/336,070, dated Mar. 31, 2011.

(Continued)

*Primary Examiner* — Jason M Borlinghaus
*Assistant Examiner* — Hao Fu
(74) *Attorney, Agent, or Firm* — Zilka-Kotab, PC

(57) ABSTRACT

A system, method, and computer program product embodied on a computer readable medium are provided. In use, census information pertinent to a group insured by one or more insurance policies is received from a user. Further, second information describing attributes of one or more insurance policies available to the group for a particular type of insurance is received from the user. In addition, for each individual or family in the group and each of the available one or more insurance policies, an application is executed that is capable of calculating uncovered costs associated with the second information and calculating a total of the uncovered costs for the group. Also, third information regarding a premium of each of the available one or more insurance policies for the group is received from the user. Moreover, fourth information regarding a rule for and type of fair sharing of a total of the premium and the uncovered costs between the group and a third party is received from the user. Still yet, the total of the uncovered costs, the third information, and the fourth information are processed to produce the fair sharing of the total of the premium and the uncovered costs of insurance between the group and the third party. In addition, payments by the group and by the third party that are consistent with the rule for fair sharing provided by the user are delivered to the user.

18 Claims, 24 Drawing Sheets

The "Fair" Sharing Of The Total Of The Premium And The Uncovered Costs Of The Insurance Between The Group And The Third Party — 1112

| | Plan Name | OAMC | HDHP | Total Savings | Savings per Employee |
|---|---|---|---|---|---|
| TOTAL | Premium | $5,780,623 | $4,701,302 | $1,079,321 | $1,884 |
| | Employee Avg. Uncovered Cost | $616,030 | $975,800 | ($359,770) | ($628) |
| | Total Costs | $6,396,653 | $5,677,102 | $719,551 | $1,256 |
| EMPLOYER | Premium | $4,624,499 | $4,264,723 | $359,775 | $628 |
| | HSA/HRA Contribution | $0 | $0 | $0 | $0 |
| | Total Cost | $4,624,499 | $4,264,723 | $359,775 | $628 |
| EMPLOYEES | Premium | $1,156,125 | $436,579 | $719,545 | $1,256 |
| | Avg. Uncovered Cost | $616,030 | $975,800 | ($359,770) | ($628) |
| | Employer's Contribution | $0 | $0 | $0 | $0 |
| | Total Cost | $1,772,155 | $1,412,379 | $359,775 | $628 |

U.S. PATENT DOCUMENTS

| | | | |
|---|---|---|---|
| 6,195,651 B1 | 2/2001 | Handel et al. | 707/2 |
| 6,195,652 B1 | 2/2001 | Fish | 707/2 |
| 6,233,537 B1 | 5/2001 | Gryphon et al. | 703/1 |
| 6,330,610 B1 | 12/2001 | Docter et al. | 709/229 |
| 6,443,843 B1 | 9/2002 | Walker et al. | 463/42 |
| 6,629,135 B1 | 9/2003 | Ross, Jr. et al. | 709/218 |
| 6,665,395 B1 | 12/2003 | Busey et al. | 379/265.09 |
| 6,826,541 B1 | 11/2004 | Johnston et al. | 705/10 |
| 6,826,552 B1 | 11/2004 | Grosser et al. | 706/47 |
| 6,859,784 B1 | 2/2005 | van Duyne et al. | 705/10 |
| 6,912,528 B2 | 6/2005 | Homer | 707/9 |
| 6,934,684 B2 | 8/2005 | Alpdemir et al. | 704/265 |
| 6,965,868 B1 | 11/2005 | Bednarek | 705/9 |
| 6,993,572 B2 | 1/2006 | Ross, Jr. et al. | 709/218 |
| 7,155,157 B2 | 12/2006 | Kaplan | 434/350 |
| 7,194,423 B2 | 3/2007 | Walker et al. | 705/14 |
| 7,277,865 B1 | 10/2007 | Silverstone et al. | 705/26 |
| 7,319,970 B1 | 1/2008 | Simone | |
| 7,346,858 B1 | 3/2008 | Berg et al. | 715/853 |
| 7,353,180 B1 | 4/2008 | Silverstone et al. | 705/7 |
| 7,426,474 B2 | 9/2008 | Schoenbaum et al. | |
| 7,426,495 B1 | 9/2008 | Corless | 705/75 |
| 7,546,254 B2 | 6/2009 | Bednarek | 705/26 |
| 7,600,007 B1 | 10/2009 | Lewis | 709/223 |
| 7,693,728 B2 | 4/2010 | Underwood et al. | |
| 7,720,705 B2 | 5/2010 | Stein | 705/10 |
| 7,725,570 B1 | 5/2010 | Lewis | 709/224 |
| 7,725,571 B1 | 5/2010 | Lewis | 709/224 |
| 7,730,172 B1 | 6/2010 | Lewis | 709/224 |
| 7,877,412 B2 | 1/2011 | Homer | 707/783 |
| 7,912,761 B2 | 3/2011 | Vaid | 705/26.2 |
| 8,028,066 B2 | 9/2011 | Lewis | 709/224 |
| 8,165,903 B1 | 4/2012 | Owen | |
| 2002/0007362 A1 | 1/2002 | Collins et al. | 707/5 |
| 2002/0042730 A1 | 4/2002 | Homer | 705/8 |
| 2002/0049617 A1 | 4/2002 | Lencki et al. | |
| 2002/0076674 A1 | 6/2002 | Kaplan | 434/107 |
| 2002/0095345 A1 | 7/2002 | Panelli et al. | 705/26 |
| 2002/0120567 A1 | 8/2002 | Caplan et al. | 705/40 |
| 2002/0120568 A1 | 8/2002 | Leblang et al. | 705/40 |
| 2002/0152163 A1 | 10/2002 | Bezos et al. | 705/40 |
| 2002/0161609 A1 | 10/2002 | Zizzamia et al. | |
| 2003/0054888 A1 | 3/2003 | Walker et al. | 463/42 |
| 2003/0233278 A1 | 12/2003 | Marshall | 705/14 |
| 2004/0006478 A1 | 1/2004 | Alpdemir et al. | 704/275 |
| 2004/0010426 A1 | 1/2004 | Berdou | |
| 2004/0057569 A1 | 3/2004 | Busey et al. | 379/265.09 |
| 2004/0081951 A1 | 4/2004 | Vigue et al. | 434/350 |
| 2004/0095378 A1 | 5/2004 | Vigue et al. | 345/723 |
| 2004/0148366 A1 | 7/2004 | Ross, Jr. et al. | 709/218 |
| 2004/0167823 A1 | 8/2004 | Neely et al. | 705/26 |
| 2004/0249719 A1 | 12/2004 | Urpani | 705/26 |
| 2005/0038679 A1* | 2/2005 | Short | 705/2 |
| 2005/0108066 A1* | 5/2005 | Weidner et al. | 705/4 |
| 2005/0187936 A1 | 8/2005 | Homer | 707/9 |
| 2005/0251440 A1 | 11/2005 | Bednarek | 705/10 |
| 2006/0203993 A1 | 9/2006 | Busey et al. | 379/265.09 |
| 2007/0160970 A1 | 7/2007 | Kaplan | 434/350 |
| 2008/0140676 A1 | 6/2008 | Silverstone et al. | 707/10 |
| 2008/0249879 A1 | 10/2008 | Walker et al. | 705/14 |
| 2009/0222358 A1 | 9/2009 | Bednarek | 705/27 |
| 2009/0326987 A1* | 12/2009 | Roudaut | 705/4 |
| 2010/0218104 A1 | 8/2010 | Lewis | 715/736 |
| 2010/0241501 A1 | 9/2010 | Marshall | 705/14.13 |
| 2011/0113067 A1 | 5/2011 | Homer | 707/783 |
| 2011/0119308 A1 | 5/2011 | Homer | 707/783 |
| 2011/0119769 A1 | 5/2011 | Homer | 726/27 |
| 2011/0125552 A1 | 5/2011 | Stein | 705/7.32 |

OTHER PUBLICATIONS

Notice of Allowance from U.S. Appl. No. 11/336.070, dated Sep. 12, 2011.

Non-Final Office Action from U.S. Appl. No. 11/336,070, dated Aug. 20, 2010.

Non-Final Office Action from U.S. Appl. No. 11/336,070, dated Apr. 27, 2009.

Final Office Action from U.S. Appl. No. 11/336,070, dated Jan. 13, 2010.

Non-Final Office Action from U.S. Appl. No. 12/790,709 mailed Aug. 19, 2010.

Non-Final Office Action from U.S. Appl. No. 12/790,709 mailed May 12, 2011.

Notice of Allowance from U.S. Appl. No. 12/790,709, dated Dec. 13, 2011.

* cited by examiner

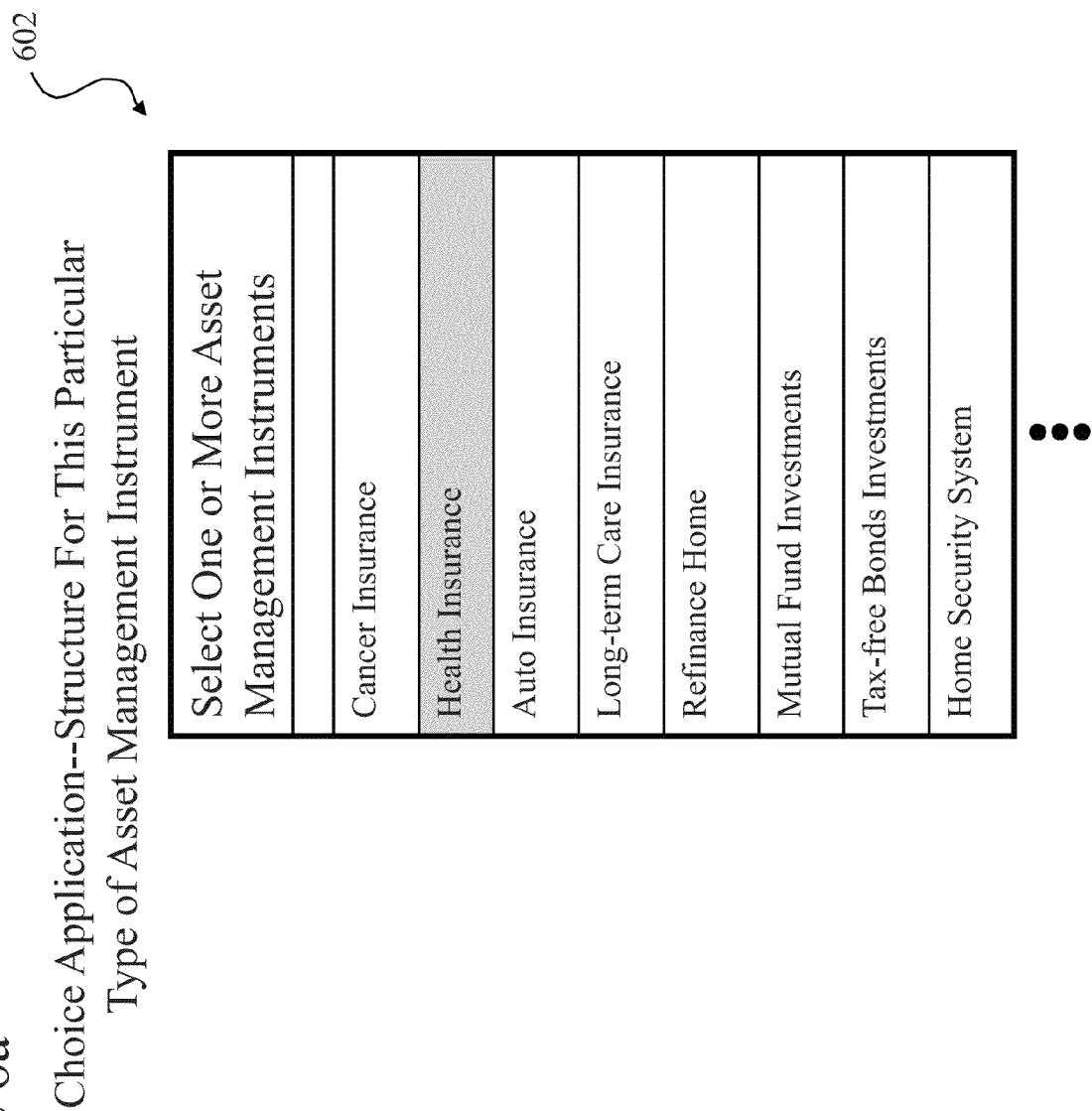
Figure 6a Choice Application--Structure For This Particular Type of Asset Management Instrument Database Of Individual Risk As A Function Of Individual Characteristics

Figure 6c

Alternatives Descriptions Catalogue: Health Insurance

| Catalogue Number | Insurance Plan | Insurance Company | Dr. Office Deductible Waived | Dr. Office Copay | Deductible per person | Hosp+ER+Outp Copay | Maximum Out of Pocket per Member | Members required to meet Deductible and Maximum | Female 55 Annual Premium | Female 55 Monthly Premium |
|---|---|---|---|---|---|---|---|---|---|---|
| 1 | BC Life & Health: Basic PPO $1000 | BC Life & Health | No | 100% | 1,000 | 20% | 3,500 | 2 | 2,220 | 185 |
| 2 | BC Life & Health: Basic PPO $2500 | BC Life & Health | No | 100% | 2,500 | 20% | 5,000 | 2 | 2,088 | 174 |
| 3 | BC Life & Health: Individual RightPlan PPO | BC Life & Health | Yes | 40% | - | 40% | 7,500 | 2 | 2,724 | 227 |
| 4 | BC Life & Health: PPO Saver | BC Life & Health | Yes | 30% | 5,000 | 20% | 5,000 | 2 | 2,808 | 234 |
| 5 | BC of CA: PPO 3500 Deductible | BC of CA | No | 100% | 3,500 | 100% | 3,500 | 2 | 2,484 | 207 |
| 6 | BC of CA: PPO 2500 Deductible | BC of CA | No | 100% | 2,500 | 100% | 3,500 | 2 | 2,484 | 207 |
| 7 | BC of CA: PPO 3500 Dr. Waived | BC of CA | Yes | 100% | 3,500 | 100% | 3,500 | 2 | 2,484 | 207 |
| 8 | BC of CA: PPO Share 1000 | BC of CA | Yes | 30% | 1,000 | 30% | 5,000 | 2 | 5,400 | 450 |
| 9 | BC of CA: PPO Share 1500 | BC of CA | Yes | 30% | 1,500 | 30% | 6,000 | 2 | 4,584 | 382 |
| 10 | BC of CA: PPO Share 2500 | BC of CA | Yes | 30% | 2,500 | 30% | 7,500 | 2 | 3,312 | 276 |
| 11 | BC of CA: PPO Share 500 | BC of CA | Yes | 30% | 500 | 30% | 5,000 | 2 | 6,468 | 539 |
| 12 | BC of CA: PPO Share 5000 | BC of CA | Yes | 30% | 5,000 | 30% | 7,500 | 2 | 2,640 | 220 |
| 13 | Blue Shield: Shield Spectrum PPO Plan 1500 100% | Blue Shield | No | 30% | 1,500 | 30% | 4,500 | 2 | 4,656 | 388 |
| 14 | Blue Shield: Shield Spectrum PPO Plan 2000 | Blue Shield | No | 30% | 2,000 | 30% | 7,000 | 2 | 3,228 | 269 |
| 15 | Blue Shield: Shield Spectrum PPO Plan 5000 | Blue Shield | No | 30% | 5,000 | 30% | 7,000 | 2 | 1,908 | 159 |
| 16 | Celticare: Any Doc PPO Plan 1000 100% | Celticare Any Doc | Yes | 0% | 1,000 | 100% | 1,000 | 3 | 6,288 | 524 |
| 17 | Celticare: Any Doc PPO Plan 2500 100% | Celticare Any Doc | Yes | 0% | 2,500 | 100% | 2,500 | 3 | 4,500 | 375 |
| 18 | Celticare: Any Doc PPO Plan 2500 80% | Celticare Any Doc | Yes | 0% | 2,500 | 20% | 3,500 | 3 | 3,744 | 312 |
| 19 | Celticare: Any Doc PPO Plan 500 80% | Celticare Any Doc | Yes | 0% | 500 | 20% | 1,500 | 3 | 6,396 | 533 |
| 20 | Celticare: Any Doc PPO Plan 5000 100% | Celticare Any Doc | Yes | 0% | 5,000 | 100% | 5,000 | 3 | 3,204 | 267 |
| 21 | Celticare: Any Doc PPO Plan 5000 80% | Celticare Any Doc | Yes | 0% | 5,000 | 20% | 6,000 | 3 | 2,892 | 241 |
| 22 | Celticare: Managed Indemnity 1000 80% | Celticare Managed | No | 20% | 1,000 | 20% | 2,000 | 3 | 6,948 | 579 |
| 23 | Celticare: Managed Indemnity 2500 100% | Celticare Managed | No | 100% | 2,500 | 100% | 2,500 | 3 | 5,724 | 477 |
| 24 | Celticare: Managed Indemnity 2500 80% | Celticare Managed | No | 20% | 2,500 | 20% | 3,500 | 3 | 4,764 | 397 |

User's Family Description

Name: Jill    Age: 55    Sex: F

Add / Delete Dependents

View / Edit Your Profiles

What is the most you could afford
to pay including the premium?    $7,000

Add / Edit Pre-tax Savings

Side-by-side Comparison of Risk and Cost for
Each Policy of Interest

― 612

| | Alternative Plans | Annual Premium, $ | Expected Total Cost Including the Premium | Risk of Paying the Most You Could Afford |
|---|---|---|---|---|
| Health Insurance | PPO 5000 | $2,928 | $4,722 | 9% |
| Health Insurance | PPO 1000 | $5,712 | $7,116 | 34% |
| | No Insurance | $0 | $3,248 | 16% |

Results

Choice Application--Structure For This Particular Type of Asset Management Instrument

Figure 7d

User's Family Description

Name
Jill

Age
55

Sex
F

Add / Delete Dependents

View / Edit Your Profiles

What is the most you could afford
to pay including the premium?
$7,000

Add / Edit Pre-tax Savings

610

Side-by-side Comparison Of The Risk And Cost From Several Asset Management Instruments Given The Families Current Protection

Figure 11a

Census Information Pertinent To a Group Insured
By One Or More Insurance Policies

1102

| No. | ID | Zip | MyPlan | Age | Sex | Age1 | Sex1 | Age2 | Sex2 | Age3 | Sex3 | Age4 | Sex4 |
|---|---|---|---|---|---|---|---|---|---|---|---|---|---|
| 1 | 334 | 53012 | OAMC | 25 | F | 28 | M | 0 | 0 | 0 | 0 | 0 | 0 |
| 2 | 352 | 53004 | OAMC | 43 | F | 39 | M | 0 | 0 | 0 | 0 | 0 | 0 |
| 3 | 355 | 53221 | OAMC | 37 | F | 34 | M | 0 | 0 | 0 | 0 | 0 | 0 |
| 4 | 423 | 60707 | OAMC | 50 | F | 55 | M | 0 | 0 | 0 | 0 | 0 | 0 |
| 5 | 434 | 48240 | OAMC | 49 | F | 53 | M | 0 | 0 | 0 | 0 | 0 | 0 |
| 6 | 445 | 48326 | OAMC | 44 | F | 43 | M | 0 | 0 | 0 | 0 | 0 | 0 |
| 7 | 639 | 53073 | OAMC | 31 | F | 32 | M | 0 | 0 | 0 | 0 | 0 | 0 |
| ••• | ••• | ••• | ••• | ••• | ••• | ••• | ••• | ••• | ••• | ••• | ••• | ••• | ••• |
| ••• | ••• | ••• | ••• | ••• | ••• | ••• | ••• | ••• | ••• | ••• | ••• | ••• | ••• |
| ••• | ••• | ••• | ••• | ••• | ••• | ••• | ••• | ••• | ••• | ••• | ••• | ••• | ••• |

Figure 11b

Receiving Information From A User Describing The Attributes Of One Or More Insurance Policies Available To The Group For A Particular Type Of Insurance

| Plan Name | OAMC | HDHP |
|---|---|---|
| Deductible Waived for Doctor Office Visits | TRUE | FALSE |
| Doctor Office CoPay, % | 0 | 0.2 |
| Doctor Office CoPay, $ | 30 | 0 |
| Inpatient, Outpatient, Emergency Co-Insurance | 0.11 | 0.2 |
| Deductible | 500 | 1500 |
| Prescription Coverage | TRUE | TRUE |
| Generic CoPay | 15 | 15 |
| Brand CoPay | 32.5 | 32.5 |
| Prescription Deductible Applies to Generic and Brand | FALSE | FALSE |
| Prescription Deductible | 0 | 0 |
| Deductible and Maximum Cumulative for Family | TRUE | TRUE |
| Max out of Pocket | 3500 | 4000 |
| Number of Members Required to Meet the Deductible | 2 | 2 |
| H.S.A Compatible | FALSE | TRUE |
| Maternity Coverage | TRUE | TRUE |
| Number of Members Required to Meet the Max | 2 | 2 |

| Total Premium for the Group | $5,780,623 | $4,701,302 |
|---|---|---|

1104 points to the attributes table. 1108 points to the Total Premium row.

Executing For Each Individual Or Family In The Group And Each Insurance Policy, An Application Capable Of Calculating The Uncovered Costs Associated With The Information About The Attributes Of An Insurance Policy And Calculating The Total For The Group

| Number | Employee ID | Uncovered Cost | |
|---|---|---|---|
| | | Aetna OAMC | Aetna HDHP |
| 1 | 334 | $ 633 | $ 1,039 |
| 2 | 352 | $ 1,952 | $ 3,168 |
| 3 | 355 | $ 494 | $ 811 |
| 4 | 423 | $ 883 | $ 1,257 |
| 5 | 434 | $ 1,718 | $ 2,592 |
| 6 | 445 | $ 510 | $ 838 |
| 7 | 639 | $ 1,702 | $ 2,626 |
| ••• | ••• | ••• | ••• |
| | Total | $ 616,030 | $ 975,800 |

1106

Fair Sharing Rule And Type Selection From A Catalogue

Figure 11e  The "Fair" Sharing Of The Total Of The Premium And The Uncovered Costs Of The Insurance Between The Group And The Third Party

SYSTEM, METHOD AND COMPUTER PROGRAM PRODUCT FOR FACILITATING INFORMED DECISIONS RELATING TO THE FAIR SHARING OF THE COSTS OF INSURANCE BETWEEN A GROUP AND A THIRD PARTY

RELATED APPLICATION(S)

The present application is a continuation-in-part of U.S. application Ser. No. 11/336,070, filed Jan. 20, 2006 now U.S. Pat. No. 8,095,392, which claims the priority of a previously filed provisional application filed Jan. 20, 2005 under Ser. No. 60/646,186, which are incorporated herein by reference in their entirety.

BACKGROUND AND FIELD OF THE INVENTION

The present invention relates to decision making logic, and more particularly to a computer-based platform which supports a decision making process.

SUMMARY

A system, method, and computer program product embodied on a computer readable medium are provided. In use, census information pertinent to a group insured by one or more insurance policies is received from a user. Further, second information describing attributes of one or more insurance policies available to the group for a particular type of insurance is received from the user. In addition, for each individual or family in the group and each of the available one or more insurance policies, an application is executed that is capable of calculating uncovered costs associated with the second information and calculating a total of the uncovered costs for the group. Also, third information regarding a premium of each of the available one or more insurance policies for the group is received from the user. Moreover, fourth information regarding a rule for and type of fair sharing of a total of the premium and the uncovered costs between the group and a third party is received from the user. Still yet, the total of the uncovered costs, the third information, and the fourth information are processed to produce the fair sharing of the total of the premium and the uncovered costs of insurance between the group and the third party. In addition, payments by the group and by the third party that are consistent with the rule for fair sharing provided by the user are delivered to the user.

BRIEF DESCRIPTION OF THE DRAWINGS

FIGS. 6a-e illustrate an example of an application of the various logic components set forth in FIGS. 3-5, in accordance with still yet another embodiment.

FIGS. 7a-e illustrate an example of an application of the various logic components set forth in FIGS. 3-5 for the simultaneous execution of multiple applications, in accordance with still yet another embodiment.

FIGS. 11a-e illustrate an example of an application of the various logic components set forth in FIGS. 9 and 10, in accordance with one optional embodiment, in accordance with another embodiment.

DETAILED DESCRIPTION

Figure 1A:
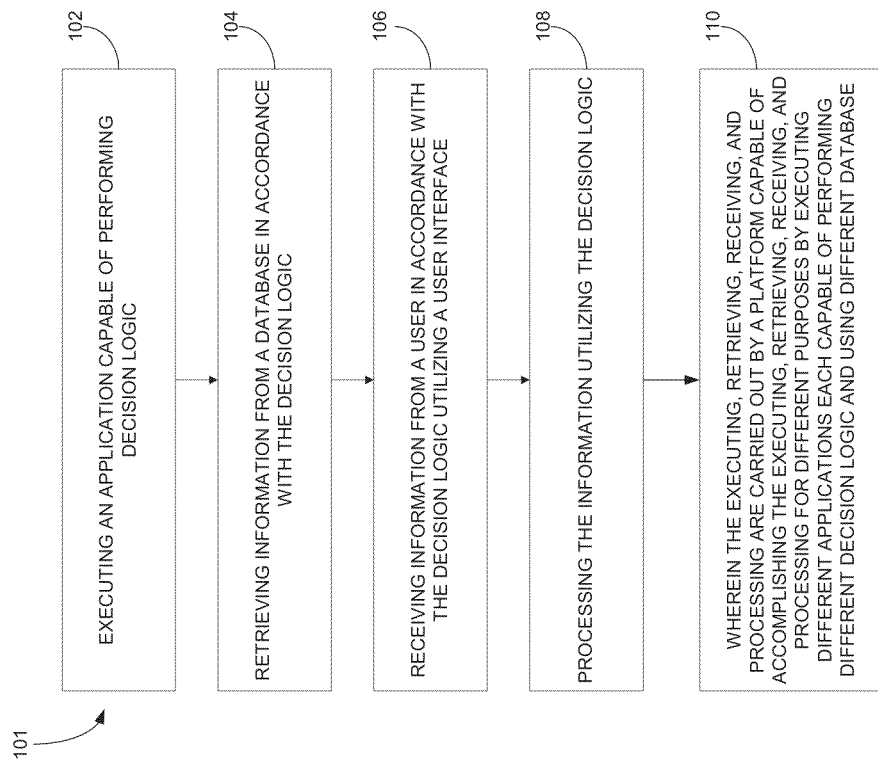
FIG. 1a illustrates a method for providing a platform adapted to run on a computing platform, in accordance with one embodiment.

FIG. 1a illustrates a method 101 for providing a choice platform adapted to run on a computing platform, in accordance with one embodiment. Initially, one or more applications capable of performing decision logic are executed. See operation 102. Such application may refer to any software program capable of performing logic capable of being used to facilitate decision making.

Information is then retrieved from a database in accordance with the decision logic, as indicated in operation 104. Information is then delivered to and received from a user in accordance with the decision logic utilizing a user interface. Note operation 106. It should be noted that, in the context of the present description, the information from operations 104 and 106 may be the same information or different, as desired.

The information is then processed in operation 108 utilizing the decision logic. In use, the foregoing operations are carried out by a platform capable of accomplishing the same for different purposes by executing different applications each capable of performing different decision logic and using different database. Note operation 110.

In one optional embodiment, the different applications are capable of being executed simultaneously. Optionally, such simultaneous operation may allow information associated with such different applications to be input and/or processed so that one or more users may make a coherent set of choices regarding different aspects of any particular area of interest including, but not limited to asset risk management, etc. It should be noted that such asset risk management is defined to include management of any assets, cash flow, and/or budgets, etc., which are affected by risk mitigation instruments (e.g. health insurance, automobile insurance, life insurance, financial investments, long term care insurance, home security devices, vehicle security devices, insurance, investments, etc.). To this end, the different applications may each be related to a particular different aspect of an area of interest.

In the context of an asset risk management system, the foregoing simultaneous execution may be used to identify optimal results (e.g. protection, etc.) given a predetermined cost, and/or identify a minimal cost while maintaining a given predetermined amount of results. In another embodiment, this may be accomplished using comparisons to facilitate decision making. For example, a comparison of total annual expected consequences (and/or the likelihood thereof) may be provided. Further, the information may optionally be processed utilizing the decision logic for determining whether a predetermined amount of resources will be exceeded, and/or for determining a likelihood thereof. More information regarding such optional comparison functionality will be set forth hereinafter in greater detail.

In the context of the present description, the aforementioned platform may include any combination of hardware and/or software. In one optional embodiment, the platform may include an individual or family choice platform that is tailored for a particular individual or family, respectively. More information regarding a particular family choice platform embodiment will be set forth hereinafter in greater detail.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
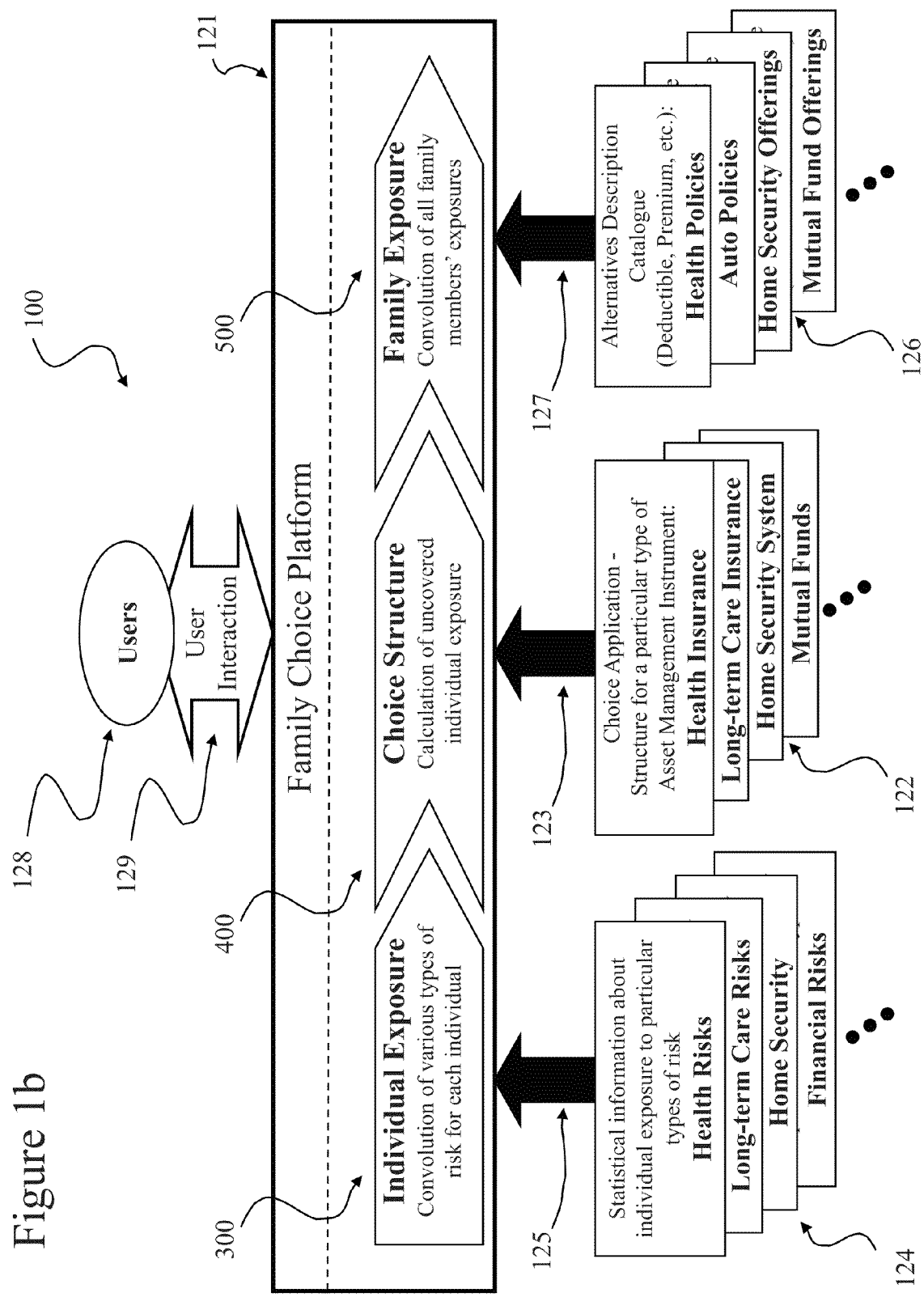
FIG. 1b illustrates a system by which the foregoing method of FIG. 1a may be carried out, in accordance with one optional embodiment.

FIG. 1b illustrates a system 100 by which the foregoing method of FIG. 1a may be carried out. Of course, however, the system 100 may be carried out in any desired environment.

As shown, a family choice platform 121 is provided which has an interface 123 with at least one application 122 for executing the decision logic, as set forth in operation 102 of FIG. 1a. Further included is a statistical database 124, which has an interface 125 with the family choice platform 121, and an alternatives description catalogue 126, with its interface 127, in accordance with operation 104 of FIG. 1a. Further, a user interface 129 is provided for receiving information from and providing information to the users 128.

The interfaces 123, 125, 127, and 129 are defined by the family choice platform 121. The users may play a part of the system 100. Note the two-headed arrow representing the users' interface 129 with the family choice platform 121 to indicate such interaction, while the single arrowhead of the interface 123, 125 and 127 indicates input. Note operation 106 of FIG. 1a. The family choice platform 121 may be run on any type of hardware architecture.

The platform may include various process operations in enabling the user to make informed choices: an individual exposure process operation, a choice structure process operation and a family exposure process operation. The purpose of the individual exposure process operation 300 is to develop frequency distributions of the total exposure for various types of risk that are pertinent to a particular type of asset risk management instruments of interest to the user. The purpose of the choice structure process operation 400 is to provide a reasonable assessment of the probability distribution representing the total cost exposure for each of the user's family members for each of the alternatives of interest for a particular type or types of asset risk management instrument(s). The purpose of the family exposure process operation 500 is to provide the user with the side-by-side comparison of the family's risk and expected total benefit or cost for each of the alternatives of interest. In another embodiment, one or more alternatives may be provided to and/or by the user. Each of these operations may be tailored to the family choice or choices at hand through the choice application.

The various operations of FIG. 1a may, in one embodiment, be carried out using universal modules capable of interfacing with different choice applications. Such different applications 122 may be capable of performing decision logic relating to the decision-making process for family choices about various types of asset risk management instruments (e.g. health insurance, car insurance, long-term care insurance, refinancing, mortgages, loans, investments, home security devices, automobile security devices, etc.). In use, the family choice platform 121 enables decision-making processes through the sequence and connectivity of a set of common displays, which describes the choice or choices to be made.

In another embodiment, several applications for different types of asset risk management instruments and their corresponding databases may be hosted simultaneously by the family choice platform. In this way, the family may make a coherent set of choices regarding, for example, different types of insurance, different types of investments or both in order to reduce the total risk to the family or to reduce the total cost of a particular level of protection.

Further, the database 124 and catalogue 126 may take the form of any one or a plurality of databases which may or may not be interconnected via a network such as the Internet. To this end, the present embodiment may be designed to foster informed and conscientious choice.

Figure 2:
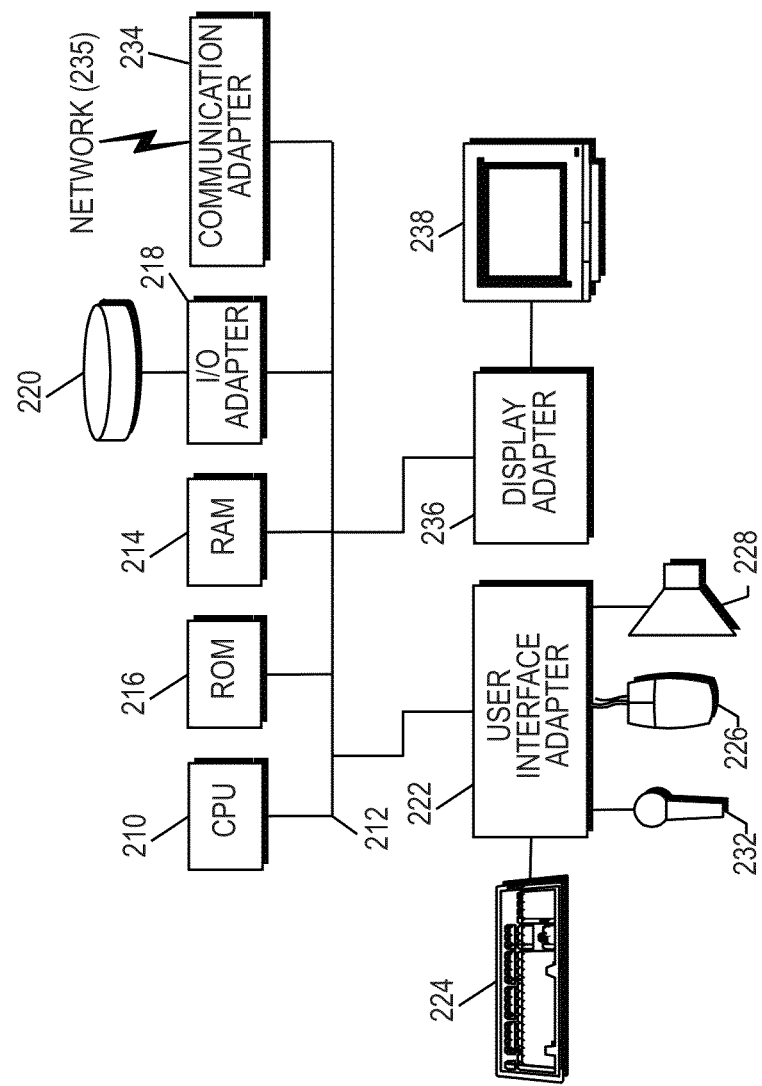
FIG. 2 shows a representative hardware environment on which the family choice platform of FIG. 1b may be implemented, in another possible embodiment.

FIG. 2 shows a representative hardware environment on which the family choice platform 121 of FIG. 1b may be implemented, in another embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present embodiment may also be implemented on platforms and operating systems other than those mentioned.

One embodiment written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the operations of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which is accessed at run-time through a component integration architecture. A component integration architecture is a set of architecture mechanisms which allow software modules in different process spaces to utilize each other's capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other.

Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it may control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. One embodiment utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation.

It should be noted that, in one embodiment, the information database and the common displays may all be treated as objects by the platform. As such, the foregoing technology may be utilized in the implementation of the overall system, as embodied in FIG. 1a.

Various Embodiments

In one optional embodiment, the platform may act as a "choice engine" which drives the decision process through a sequence of logical operations to provide decision-relevant information. The users' interface during these operations is the set of common displays exhibited by the platform. The users receive and provide specific decision-relevant information to the platform by entering or modifying the information in the display areas where appropriate. In order to start the process, the platform hosts one or more choice applications selected by the user that provides the structure for the type of asset risk management instruments that are of interest to the user. The application and platform communicate through a standard interface protocol. The platform guides the user through various process operations (e.g. individual exposure, choice structure, family exposure, etc.), but these are tailored to the choice type selected by the user through the choice application.

Figure 3:
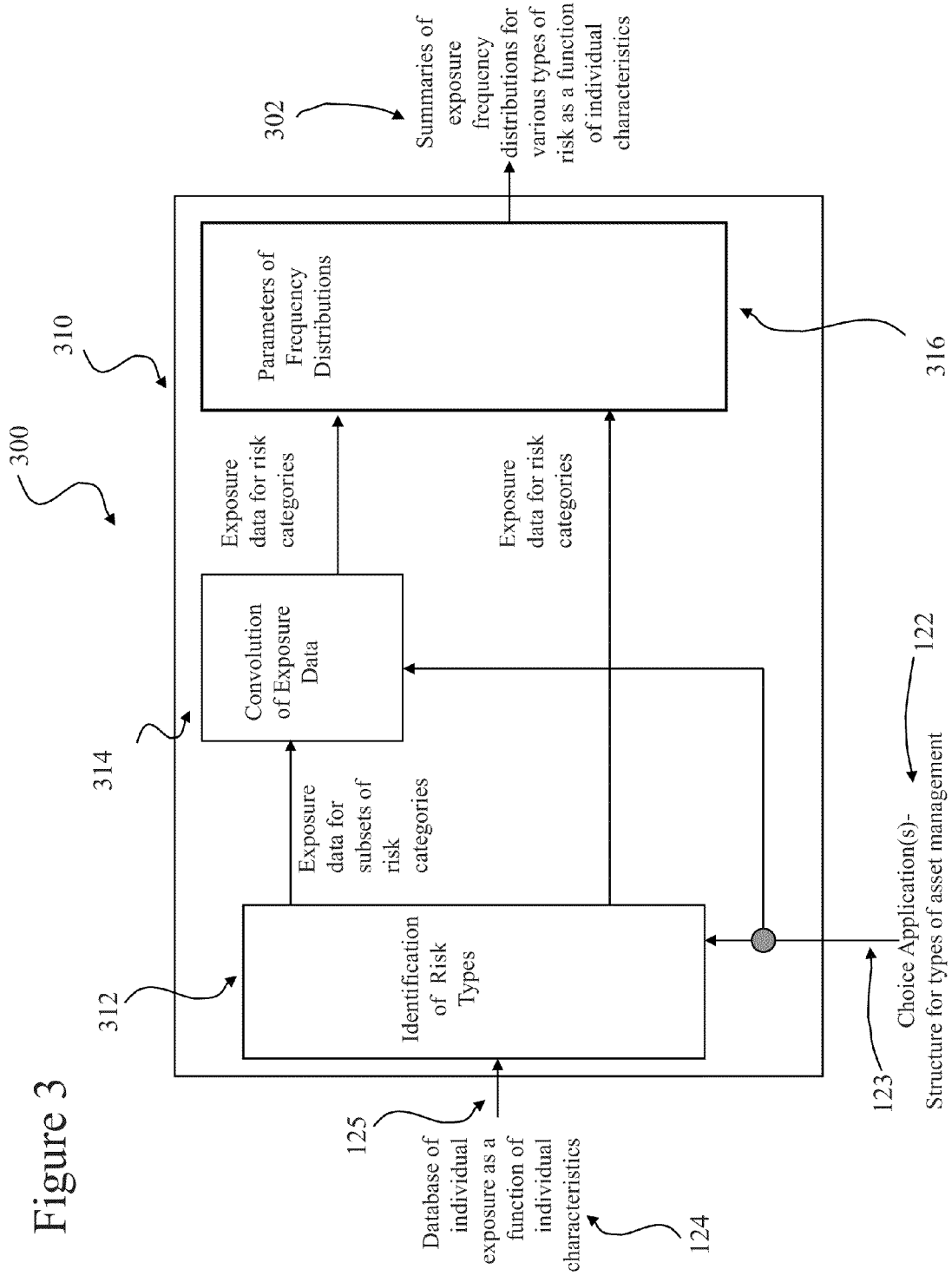
FIG. 3 illustrates various logic associated with individual exposure, in accordance with one embodiment.

FIG. 3 illustrates various logic 310 associated with the individual exposure 300, in accordance with one embodiment. As an option, the logic 310 may be implemented in the context of the architecture and environment of the previous figures. Of course, however, the logic 310 may be carried out in any desired environment.

The purpose of the individual exposure process operation 300 is to develop frequency distributions of the total cost exposure for various types of risk that are pertinent to the application or applications selected by the user. These frequency distributions may generally be a function of a variety of individual characteristics 302, such as age, general health, wealth portfolio, etc. The choice type may be specified by the user through the selection of a particular type or types of choice application(s) 122.

As a part of the individual exposure model, each particular choice application provides a description and equations for the structure of the type(s) of asset risk management instruments selected as input in a specific format or protocol 123 specified by the family choice platform. Such input may include identification of the pertinent risks to which the family is exposed. For example, for the health insurance choice application, pertinent risks could be hospital visits, doctor office visits, emergency room treatments, prescription drugs, etc.

Using this key input from the choice application(s) 122 in the specific format associated with the relevant interface 123, a first module 312 of the individual exposure process operation for identification of risk types prompts a database of risk exposure data 124 for risks that are pertinent to the family choice for the type asset risk management instrument(s) of interest to the user as indicated by the choice application(s) 122. "Risk exposure data" may, in one embodiment, refer to a statistical compilation of the historical frequency distribution on the benefits and costs associated with a particular type of risk. This data may be available as a function of several individual characteristics, such as age, general health, driving record, financial portfolio, zip code etc.

The risk exposure data 124 for some of the risks may be useable as-is, but the data for other risks may have to be combined in order to provide the risk exposure data for risk types required by a particular choice application selected by the user. For example, risk exposure data is available for emergency room visits, hospital stays and outpatient treatments, but health insurance policies cover "major medical" risks, which is the combination of all three of these risks.

As another example, the performance of some investment types may be influenced by business risks, exchange rate risks and inflationary risks. Therefore, the convolution of exposure data module 314 convolves the exposure data for any risk types that are combined in the choice application. "Convolution," in one embodiment, refers to the mathematical combination of frequency distributions of different types of risk into a frequency distribution describing the combined risk.

Once exposure data for all covered risks have been obtained from the identification of risk types module 312 and the convolution of exposure data module 314, a parameters of the frequency distributions module 316 provides a model of the exposure for each covered risk as a function of individual characteristics that are relevant to choice type specific by the user. Hence, the results are summaries of the exposure frequency distributions for various risks as a function of individual characteristics for the choice application(s) selected by the user.

One embodiment of the parameters of the frequency distributions module is to approximate the moments of the frequency distribution for each risk type as a function of the individual characteristics. For example, if the central moments of the frequency distribution are denoted by $\langle V \rangle$, $\langle V^2 - \langle V \rangle^2 \rangle$, $\langle V^3 - \langle V \rangle^3 \rangle$, etc., and each of these moments is a function an individual characteristic, x, the dependency of the frequency distribution on x can be modeled as that set forth in Equations #1 and 2 below:

Equations #1 & 2

$$\langle V \rangle(x) = \langle V \rangle(x_0) + \frac{\delta \langle V \rangle}{\delta x}(x - x_0) + \frac{1}{2}\frac{\delta^2 \langle V \rangle}{\delta x^2}(x - x_0)^2, \quad (1)$$

$$\langle V^2 - \langle V \rangle^2 \rangle(x) = \qquad\qquad (2)$$
$$\langle V^2 - \langle V \rangle^2 \rangle(x_0) + \frac{\delta \langle V^2 - \langle V \rangle^2 \rangle}{\delta x}(x - x_0) + \frac{1}{2}\frac{\delta^2 \langle V^2 - \langle V \rangle^2 \rangle}{\delta x^2}(x - x_0)^2,$$

(etc.)

An arbitrary level of accuracy in representing the available frequency distributions can be obtained by increasing the order of the above equations. If x is the age of the insured, the equations above may be a reasonable representation of the frequency distribution on exposure as a function of age.

Figure 4:
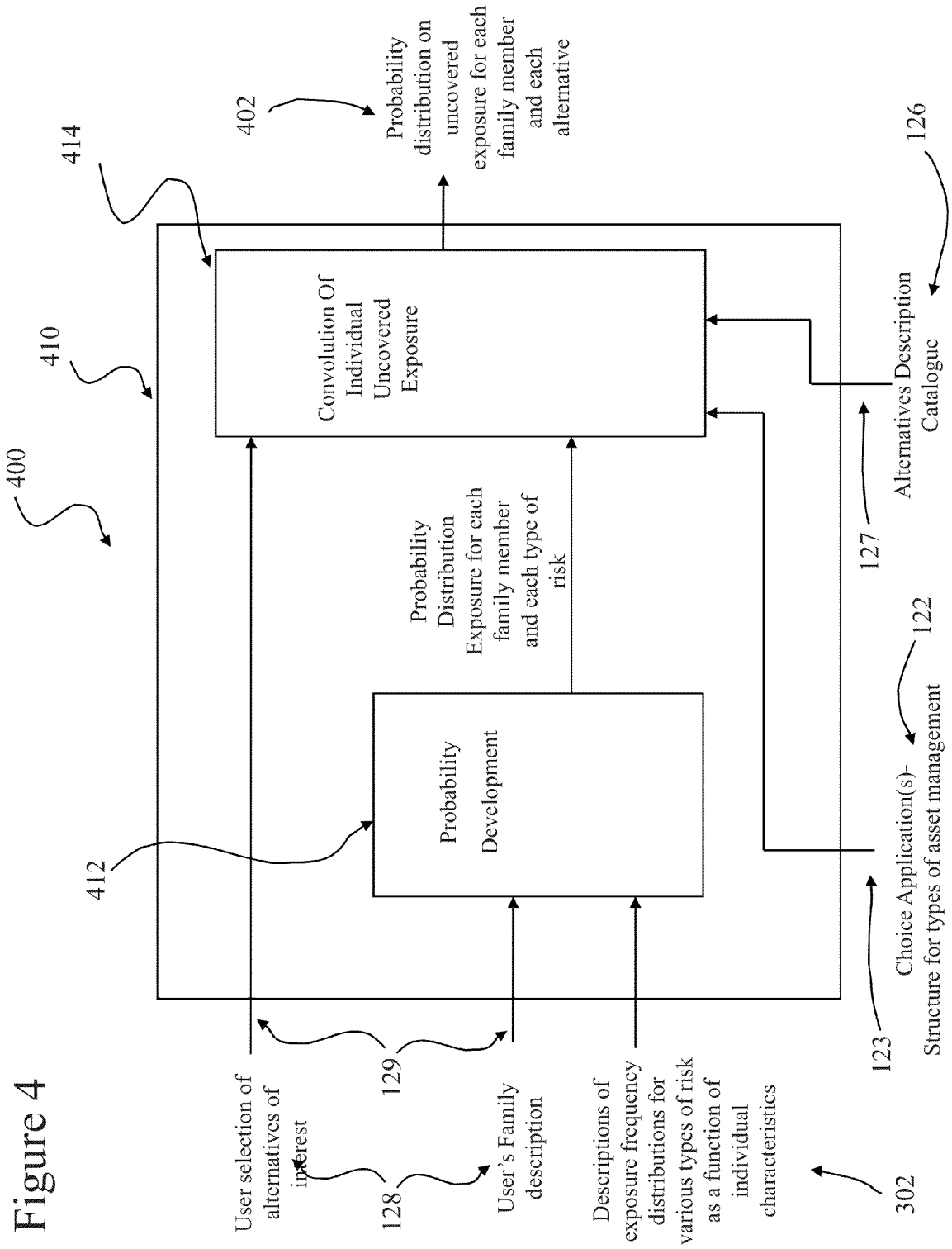
FIG. 4 illustrates various logic associated with a choice structure process operation, in accordance with another embodiment.

FIG. 4 illustrates various logic 410 associated with the choice structure process operation 400, in accordance with another embodiment. As an option, the logic 410 may be implemented in the context of the architecture and environment of the previous figures. Of course, however, the logic 410 may be carried out in any desired environment.

The purpose of choice structure is to provide a reasonable assessment of the probability distribution representing the total exposure for each family member for each alternative of interest 402 for the type of asset risk management instruments that has been selected by the user. After the individual exposure operation, the platform moves to the choice structure operation, and receives input about the structure of the type of asset risk management instrument from the choice application 122.

As an example, for insurance such input may include the existence and nature of deductibles, the types of risks that are covered, the existence and nature of a maximum coverage or insurance cap, whether coverage is by occurrence or amount (e.g. coverage per doctor's office visit, an annual coverage for all doctors' offices visits, etc.) or both, the existence and nature of insured's copays, individual and family characteristics that affect the premium, and/or the relationship of the above elements. Choice structure also receives data about specific alternatives from the alternative description catalogue database 126. The user selects the particular alternatives of interest from the database and provides information describing his/her family 128.

Included with the logic of choice structure 410 is a first probability development module 412 that receives the summaries of total exposure frequency distributions for various risks as a function of individual characteristics for risks that are pertinent for the type of asset risk management instrument(s) selected by the user 302, which was generated by the logic of the individual exposure model 310. This probability development module 412 obtains information about the user's family from the user 128. This information enables the module to generate a reasonable assessment of the probability distribution describing the prospective risk exposure for each family member, using, for example, Equations #1 & 2, etc. Here, the "probability" distribution, which describes the prospective risk, may be distinguished from the "frequency" distribution, which gives statistical information about the past. It is the probability distribution that may be helpful to informed decision making.

A second choice structure module, the convolution of individual uncovered exposure module, 414 includes logic to "subtract" any protection from risk provided by each choice application 122 from the probability distribution on exposure for each family member for each risk, which is the output of the first probability development module 412. Because the exposure is described by a probability distribution, this "subtraction" may be performed by convolving the protection provided by a particular alternative of interest in the type(s) of asset risk management instruments selected by the user.

Convolution may be accomplished through several methods, such as analytical convolution and probabilistic simulation. The particular alternatives of interest are selected by the user 128 from the catalogue of alternative descriptions 126. The result of this convolution module is a probability distribution on uncovered exposure for each family member for each alternative of interest 402. The resulting "uncovered exposure" is the exposure not covered by any risk protection, such as insurance, stop-losses, interest rate limitations, home security devices, vehicle security devices, etc., that might be included in a particular alternative of interest for the selected asset risk management instrument(s).

Figure 5:
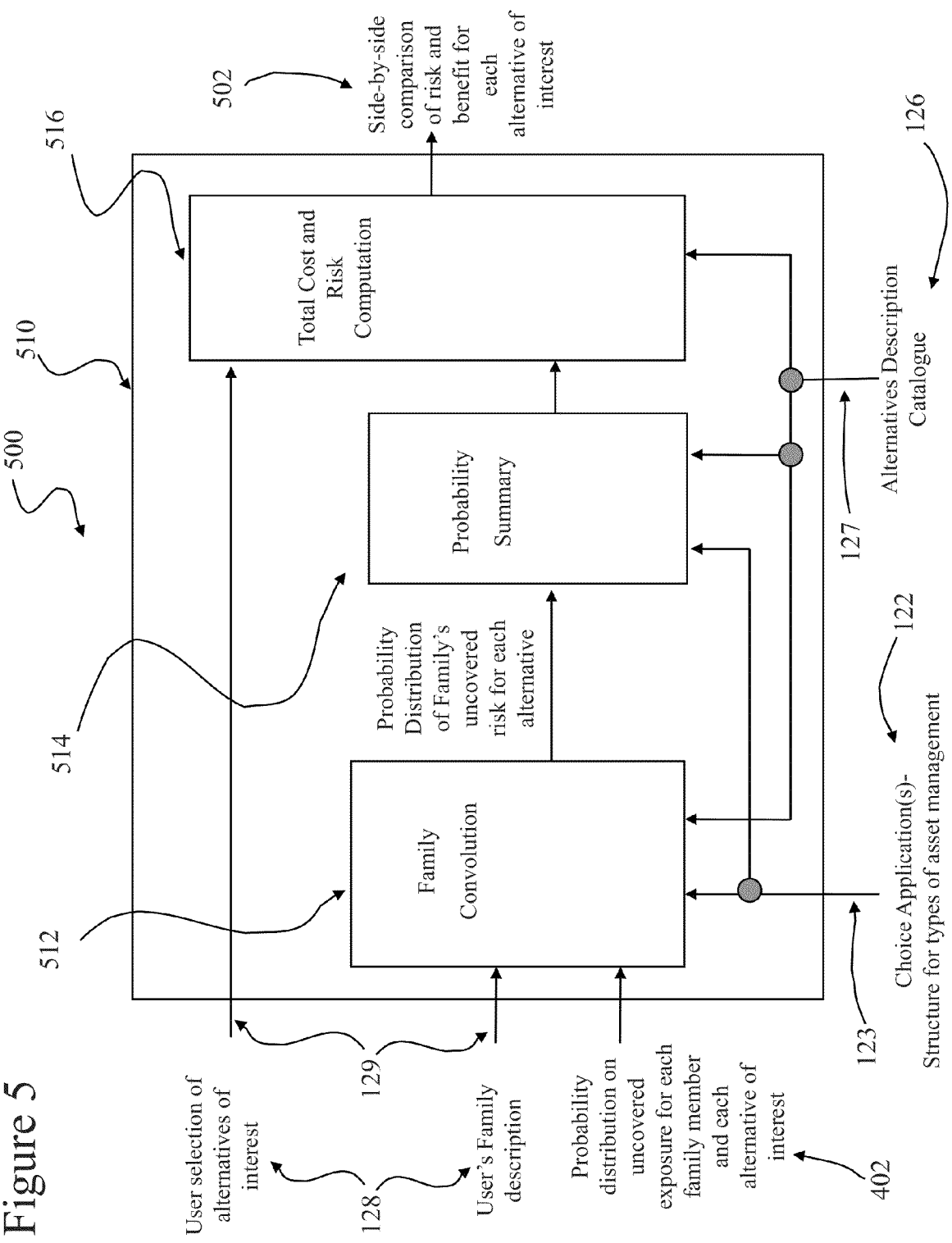
FIG. 5 illustrates various logic associated with family exposure, in accordance with yet another embodiment.

FIG. 5 illustrates various logic 510 associated with a family exposure operation 500, in accordance with yet another embodiment. As an option, the logic 510 may be implemented in the context of the architecture and environment of the previous figures. Of course, however, the logic 510 may be carried out in any desired environment.

The purpose of the family exposure process operation is to provide the user with a side-by-side comparison of the family's risk and total benefits or costs for each alternative of interest to the user 502. Subsequent to the choice structure process operation, the platform moves to the family exposure process operation 500 and receives information about the choice structure selected by the user from the choice application(s) 122. Family exposure 500 also receives data about specific alternatives from the alternatives description catalogue database 126. The user selects the particular alternatives of interest from the catalogue and provides information describing his/her family 128.

The logic 510 of the family exposure model 500 includes a first family convolution module 512 that combines the probability distributions of uncovered exposure for each family member for each alternative of interest 402 into a probability distribution on uncovered exposure for the family, as a whole. As before, the appropriate way to combine probability distributions is to convolve them. The family convolution module also takes as input the choice application(s) 122, the catalogue of policy descriptions 126 and the user's family description and selection of alternatives of interest 128.

The output of the first family convolution module 512 is further used by a second module 514 of the family exposure operation. The second probability summary module 514 takes as input the probability distribution on uncovered exposure for the family, as a whole, for each alternative of interest from the first module 512 and input from the choice application 122. It provides summary information about the risk and cost pertinent to the informed choice by the user. For example, summary information for a health insurance policy could be the annual expected cost that is not covered by the insurance policy and the likelihood or probability that the annual out-of-pocket cost is more than the family can afford. For long-term care insurance, the summary information could be the expected life-time cost of the policy and the likelihood or probability that long-term care consumes a specified portion of the family's assets. The summary information may be different for types of asset risk management instruments.

In parallel with the first and second family exposure modules is a third total risk and cost computation module 516 that takes as input summary information about the risk and total cost pertinent to the informed choice among alternatives, which is the output of the second analysis module 514, the choice application 122, the alternative description catalogue 126 and the user's of alternatives of interest 128. With such input, the third total risk and cost computation module 516 provides the side-by-side comparison of risk and total cost for each of the alternatives of interest.

For example, the side-by-side comparison of health insurance policies could be the annual total expected cost, which is the expected uncovered cost plus the premium and the likelihood or probability that the annual out-of-pocked cost is more than the family can afford. Given this information, the user may make an informed and conscientious choice. The information provided in the side-by-side comparison may be different for types of asset risk management instruments, but the family choice platform assures a common format.

FIGS. 6*a*-*e* illustrate an example of an application of the various logic components set forth in FIGS. 3-5, in accordance with still yet another embodiment. As shown, such illustrative application of the family choice platform relates to an individual and his/her spouse, the users, selecting a family health insurance policy to reduce risk to the family.

Figure 6B:
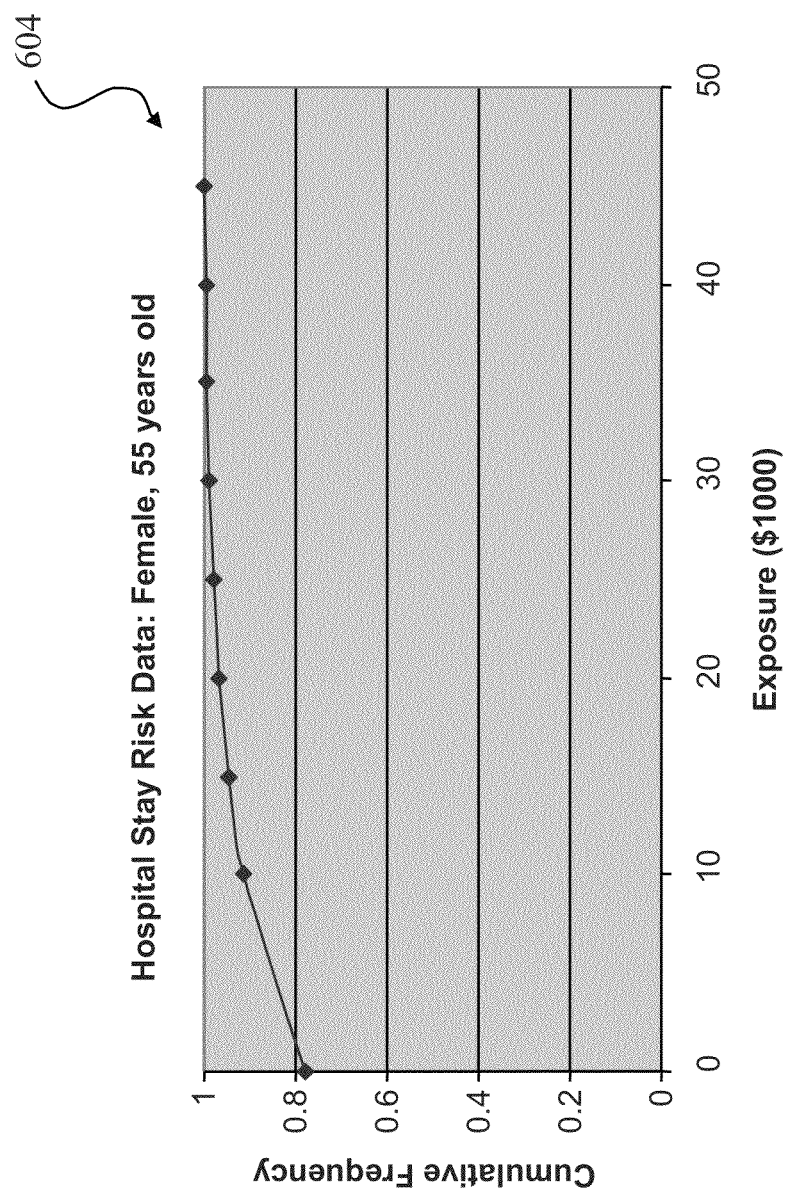

In the individual exposure process operation, the family choice platform uses input from the choice application 602 shown in FIG. 6*a*, which is selected by the user to select the type of asset risk management instrument(s). That selection provides the platform with information about what risks are covered in order that the appropriate frequency distributions on exposure 604, which is shown in FIG. 6*b*, may be selected from a database by the platform and combined where necessary. The individual exposure process operation produces descriptions of frequency distributions for various types of covered risks as a function of individual characteristics, such as sex, age, etc.

In the choice structure process operation, the family choice platform also uses input from a selected choice application 602 shown in FIG. 6*a* to provide the platform with the structure of health insurance, such as equations describing the relationship of the deductible and the maximum out-of-pocket to the uncovered exposure. As shown in FIG. 6*c*, the platform displays to the user a catalogue of alternative policy descriptions 606. The user may select policies of interest from the catalogue 606 or describe policies that are not included in the catalogue. Note that, as shown in FIG. 6*d*, the user also provides a family description 610. The choice structure process operation produces probability distributions on uncovered exposure for each family member for each policy of interest.

In the family exposure process operation, the family choice platform uses input from the choice application 602, the catalogue of health insurance policy descriptions 606, the policies of interest to the user 608, the user's family description 610 and results from the choice structure process operation, the probability distributions on uncovered exposure for each family member for each policy of interest, to produce the side-by-side comparison of risk and total cost for each policy of interest 612, as shown in FIG. 6*e*.

Figure 7A:
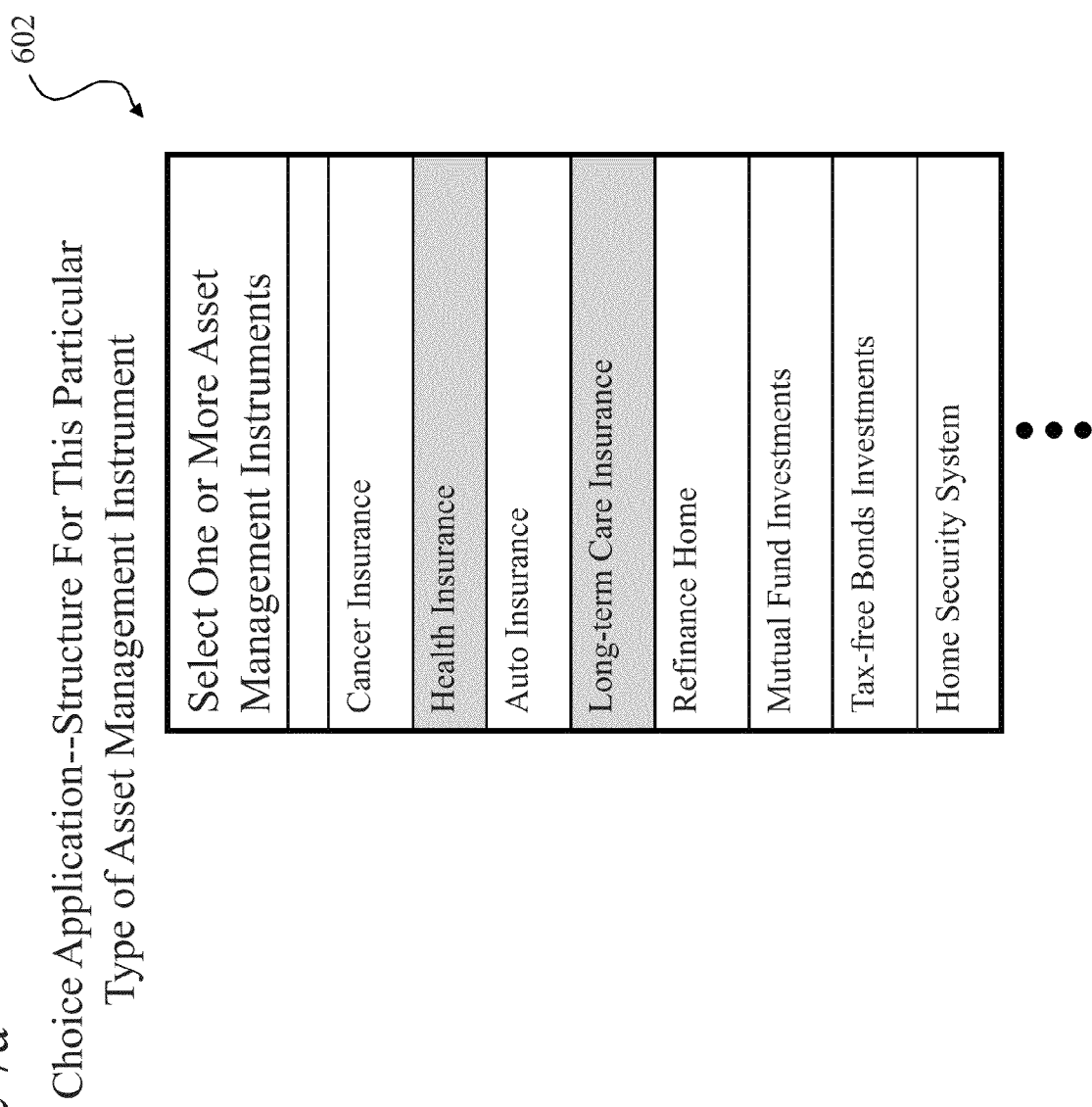
Figure 7B:
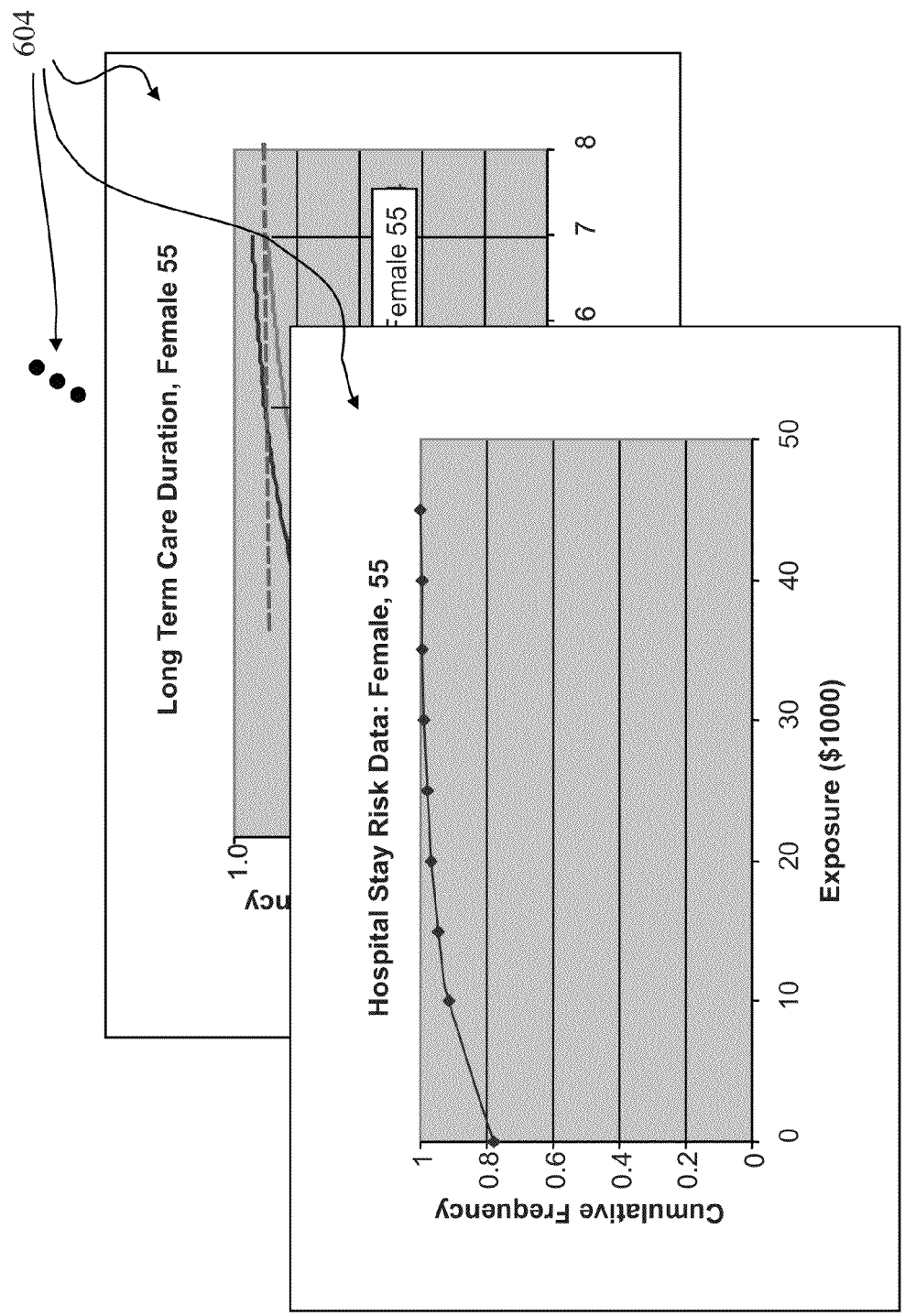

In the event that the user is concerned with reducing the total risk to the family or reducing the total cost of a particular level of protection, the user may select several types of asset risk management instruments from the choice application 602, as shown in FIG. 7*a*. That selection provides the platform with information about what risks are covered by the various asset risk management instruments in order that the relevant frequency distributions on exposure 604 shown in FIG. 7*b* may be selected from several databases by the platform, and combined as necessary.

Figure 7C:
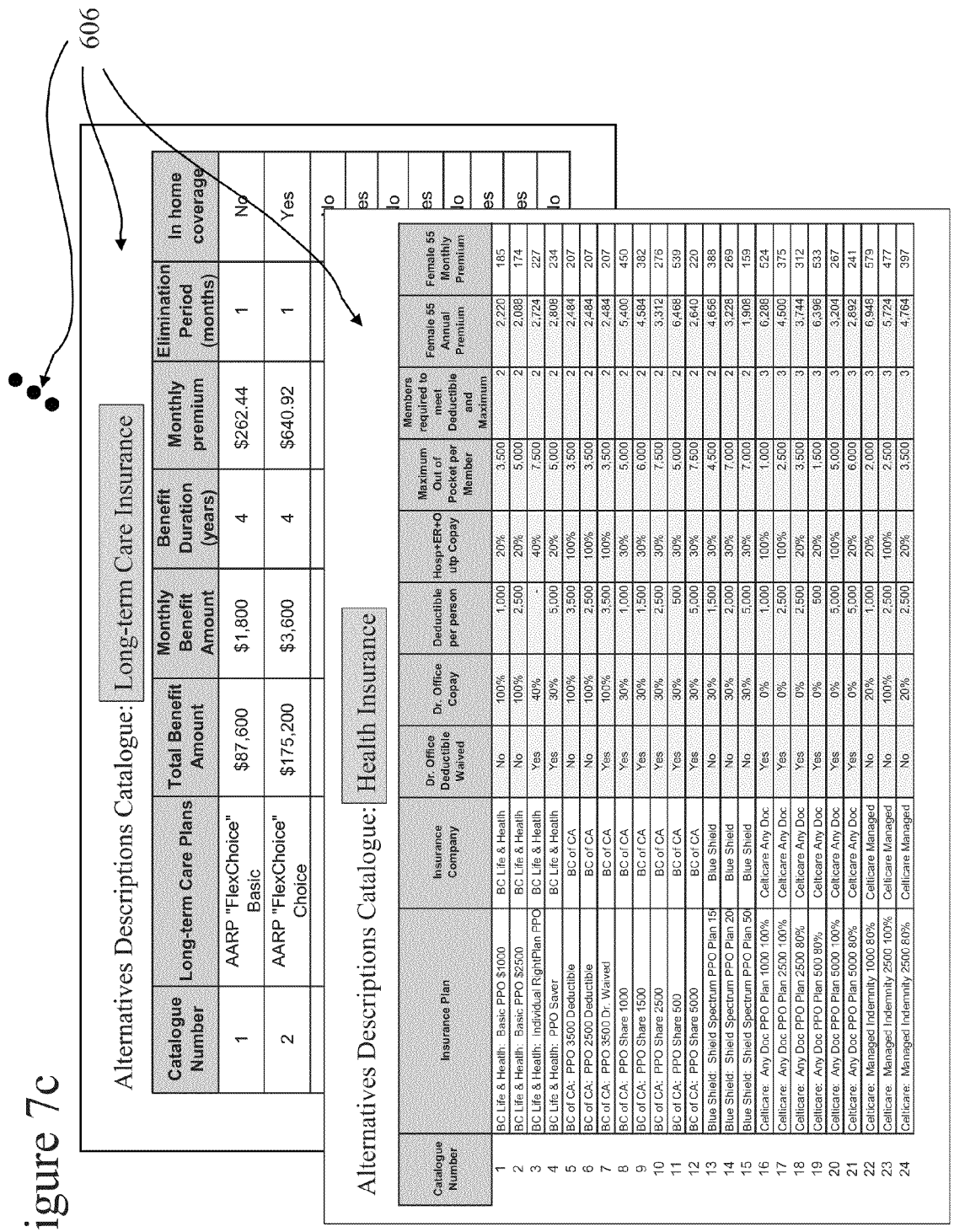

Rather than selecting several alternatives from a single alternatives description catalogues, the user may select the alternative that describes the family's current coverage in each of several catalogues 606 shown in FIG. 7*c*. The family may be described via an interface 610 that is shown in FIG.

Figure 7E:
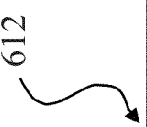

7d. Further, the side-by-side comparison of risk and cost shown in FIG. 7e is not necessarily for different alternatives regarding one type of asset risk management instrument, but rather it includes a side-by-side comparison of the risk and cost given the current protection provided by several asset risk management instruments.

As shown in FIG. 7c, the various applications may have a common interface specified by the family choice platform in order to facilitate the side-by-side comparison from several asset risk management instruments.

Figure 8:
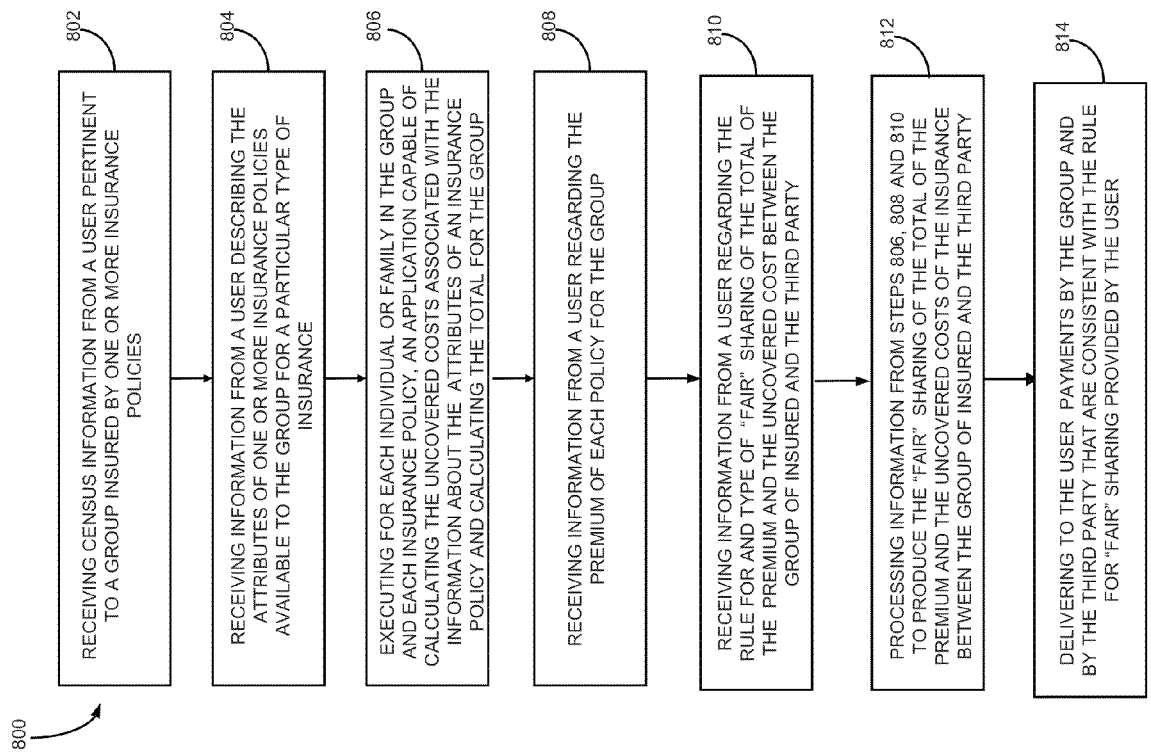
FIG. 8 illustrates a method for providing the "Fair" sharing as determined by a user between an insured group and a third party of the premium and uncovered costs of insurance, in accordance with another embodiment.

FIG. 8 illustrates a method 800 for providing a fair sharing between a group and a third party of the total of the premium and uncovered costs associated with one or more insurance plans adapted to run on a computing platform, in accordance with another embodiment. As an option, the method 800 may be carried out in the context of the architecture and environment of the previous figures. Of course, however, the method 800 may be carried out in any desired environment.

Initially, information is received from a user utilizing a user interface (e.g. based on other information delivered to the user). See operations 802 and 804. The information includes census information pertinent to a group insured by one or more insurance policies and information describing attributes of one or more insurance policies available to the group for a particular type of insurance.

The information is then processed in operation 806 utilizing an application capable of processing information about each individual and/or family in the group and one or more insurance policies available to the group. As shown, for each individual or family in the group and each of the available insurance policies, an application is executed that is capable of (e.g. for) calculating uncovered costs associated with the information describing the attributes and calculating a total of the uncovered costs for the group.

Information is again received from the user utilizing a user interface (e.g. based on other information delivered to the user). See operations 808 and 810. The information received in operations 808 and 810 includes information regarding a premium of each of the available insurance policies for the group and information regarding a rule for and type of fair sharing of a total of the premium and the uncovered costs between the group and a third party. This information and the results of operation 806 are processed in operation 812, and delivered to the user through a user interface. Note operation 814. The processing in operation 812 may be for producing the fair sharing total of the premium and the uncovered costs of insurance between the group and the third party. In addition, the delivery in operation 814 may include delivering to the user payments by the group and by the third party that are consistent with the rule for fair sharing provided by the user.

In one optional embodiment, the fair sharing is determined for existing insurance policies. In another optional embodiment, the fair sharing is determined for a new policy or policies. It should be noted that such insurance is defined to include instruments for the risk management of any assets (e.g. health insurance, automobile insurance, life insurance, long term care insurance, etc.).

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 9:
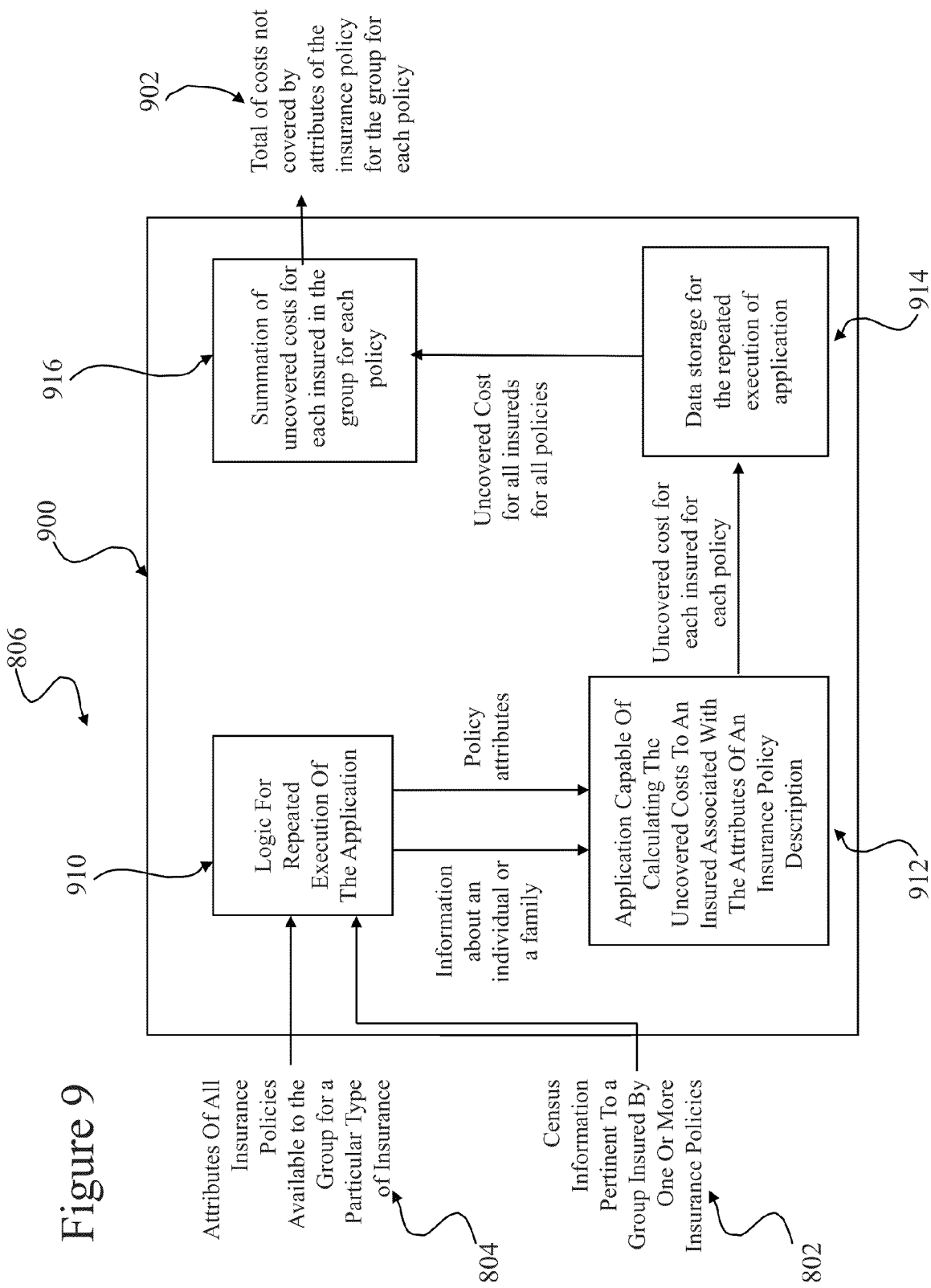
FIG. 9 illustrates various logic associated with obtaining the uncovered costs for the insured group, in accordance with yet another embodiment.

FIG. 9 illustrates various logic 900 associated with calculating the total uncovered costs for a group associated with the attributes of an insurance policy to 806, in accordance with yet another embodiment. Of course, the logic 910 may be carried out in any desired environment.

The purpose of operation 900 is to develop the total of costs not covered by attributes of the insurance policy for the group for each policy of a particular type of insurance available to the group. This total may generally be a function of a variety of characteristics of member of the group 802, such as age, sex, family configuration, etc., and the attributes of the insurance policy 804, such as deductible, copays, coinsurance, insurance maximums, etc. In this particular embodiment the logic relies on an application capable of calculating the uncovered costs to an individual or a family associated with the attributes of an insurance policy description 912. Because such application 912 may only calculate the uncovered cost for one individual or one family and one policy at a time, certain logic for the repeated execution of the application for all the individuals and families in the group and all policies available to the group may be required 910. Hence, the logic 910 provides one-at-a-time pairs of a description of an individual or a family and a policy and causes execution of the application 912. This sequence is repeated for all individuals and families in the census 802 and all policies 804 available to the group. Similarly, because the results of the application 912 may only provide the uncovered cost for one individual or family and one policy at a time, data storage for the results of the repeated execution of the application may be required 914, storing the uncovered cost for each one-at-a-time pair. Finally, an operation 916 may use the completed data base to produce the total of costs not covered by attributes of the insurance policy for the group for each available policy 902. Of course, the application 912 may combine all or some of the logics of 910, 912, 914 and 916.

Figure 10:
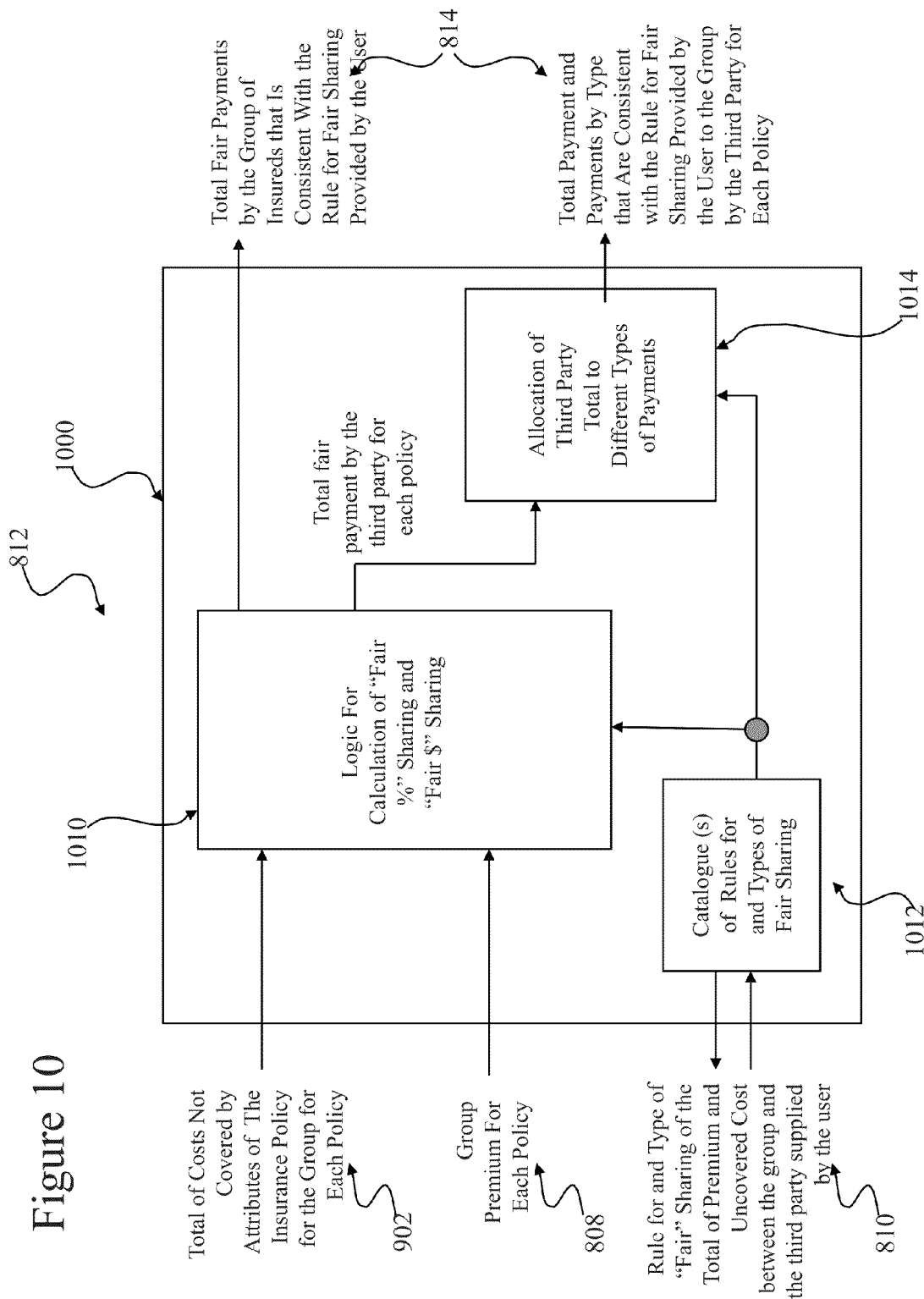
FIG. 10 illustrates various logic associated with the "Fair" sharing as defined by a user of the total of the premium and uncovered costs between the insured group and the third party, in accordance with still yet another embodiment.

FIG. 10 illustrates various logic 1000 associated with step 812 the "fair" sharing operation, in accordance with still yet another embodiment.

The purpose of operation 1000 is to process information regarding the total uncovered cost for the group, the total group premium for each policy and a user's definition of "fair" to produce the "fair" sharing of the total of the premium and the uncovered costs of the insurance between the insured group and the third party 812.

The total of costs not covered by attributes of the insurance policy for the group for each policy 902, which is generated by the logic for calculating the uncovered cost for the group 900, is input to the logic for calculation of fair sharing 1010. Also, the total premium for the group for each insurance policy 808 is input to the logics of the calculation of fair sharing 1010. The user selects through a user interface a particular rule 810 and for defining "fair" and a type of sharing from a catalogue or catalogues of choices 1012. Note the dual arrows between the user selection 810 and the catalogue 1012. Among the choices in the catalogue 1012 may be "Fair % Sharing" and "Fair $ Sharing".

Fair % Sharing could mean that the third party pays an equal percentage of the total of premium and the uncovered costs associated with the attributes of the policy for all policies available to the group. Consequently, the dollar payment to each individual or family may be different for each policy available to an individual or a family, because the total of premium and the uncovered costs associated with the attributes of the policy may different for each policy available to the group.

"Fair $ sharing" is another rule that could be included in a catalogue. For example, the third party may be interested in inducing individuals in the group to switch from their current policies to a new, lower-cost policy. In that case the third party may desire to share the dollar savings between the group's existing policies and the new policy. In that case, for each sub-group that has a particular policy, the third that makes the dollar savings in the total of premium and the uncovered costs associated with the attributes of that policy equal between that sub-group and the third party. The total dollar savings between the new plan and the various current plans held by the sub-groups may be different and the third party's dollar payment to sub-groups would be different depending on which current plan is held by the sub-group.

Depending on the user's selection, through a user interface, of a rule and type of sharing 810 from the catalogue of Rules and Types of Fair Sharing 1012, the appropriate fair sharing logic is executed Fair % Sharing or Fair $ Sharing 1010.

Of course, other sharing rules besides Fair % sharing and Fair $ sharing may be included in the catalogue and appropriate logic included in the calculation 1010.

The user may also select through a user interface the type of sharing of interest from a catalogue 1012. "Type" of sharing may refer to the manner in which the third party's payment or payments are made to the insured group. For example, the payment may be made as a portion of the insurance premium, as a contribution to a Health Reimbursement Account (HRA) or as a contribution to a Health Savings Account (HSA) or as some combination of them. Of course, other types of payments may be made by the third party, such as premium payments for other kinds of insurance. Logic for the allocation of portions of the total payment by the third party to different types of payments maybe included 1014, receiving the total fair sharing payment for the third party for each policy from the fair sharing logic 1010 and the allocation of that total to different types of payment from the catalogue 1012. The allocation logic 1014 then produces the total payment and payments by type that are consistent with the rule for fair sharing provided by the user to the group by the third party for each policy 814.

Finally, the total amount and type of payments by the third party and the payment by the group 814 are reported to the user through a user interface.

FIGS. 11*a-e* illustrate an example of an application of the various logic components set forth in FIGS. 9-10, in accordance with still yet another embodiment. As shown, such illustrative application of fair sharing relates to an employer selecting a fair payment for health insurance for a group of employees.

Figure 11C:
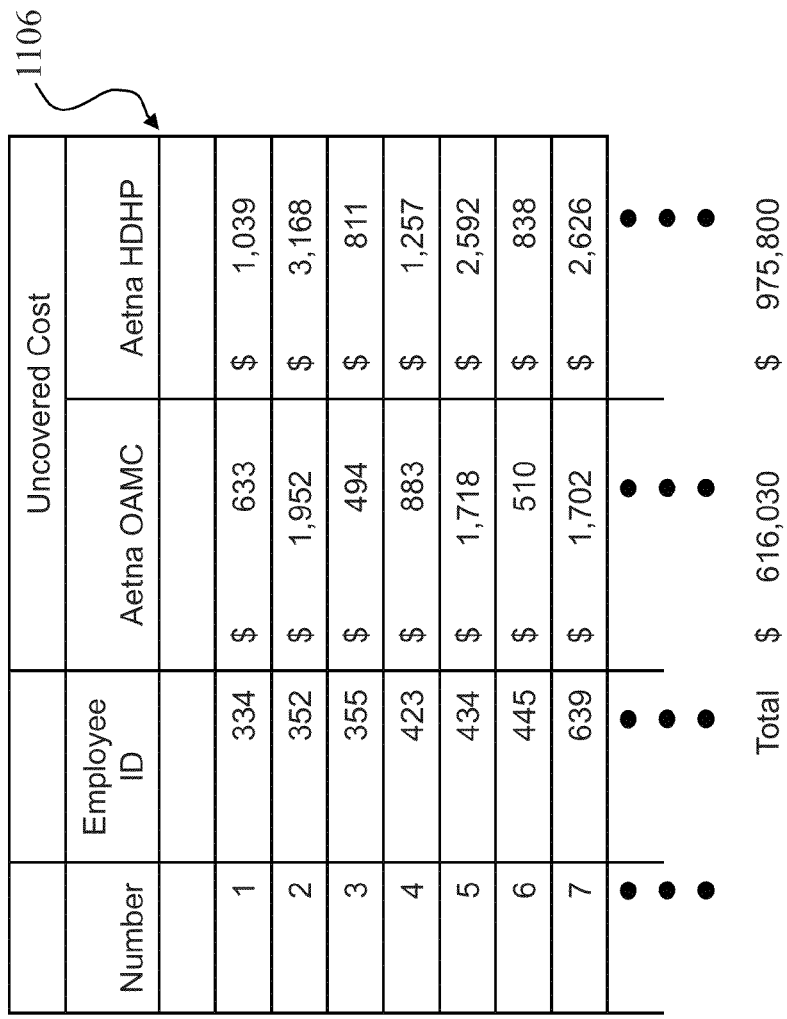

The uncovered costs for the group process operation (FIG. 9) uses input information in the form a census of the employees 1102 shown in FIG. 11*a* and a description of the insurance policies 1104 shown in FIG. 11*b*. The same process operation produces for each individual employee and each employee family the expected or average cost not covered by the attributes of the insurance policy 1106 shown in FIG. 11*c*. The expected or average uncovered cost for each individual and family can be added to provide the total expected or average cost not covered by the attributes of the insurance policy for the group of employees 1106.

Figure 11D:
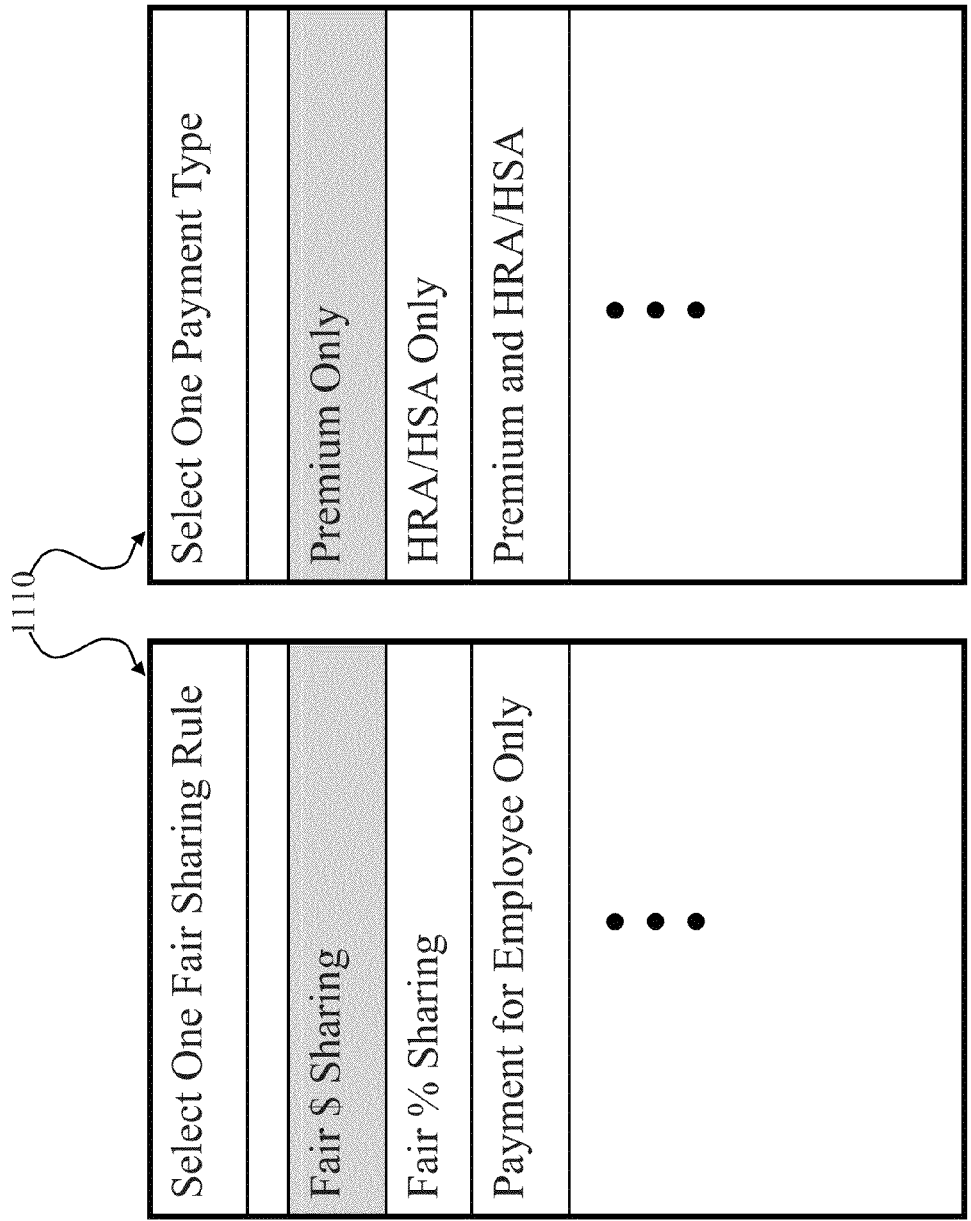

The fair sharing process operation (FIG. 10) uses input from the user regarding the group premium for each policy 1108, as shown in FIG. 11*b*, and the fair sharing rule and type selected from a catalogue 1110 and shown in FIG. 11*d*. It also uses the results from the uncovered costs for the group process operation. The fair sharing process operation results in the total payment and payments by type that are consistent with the rule for fair sharing provided by the user to the employee group by the employer for each policy 1112, as shown in FIG. 11*e*.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving census information from a user pertinent to a group insured by one or more insurance policies;
   receiving second information from the user describing attributes of one or more insurance policies available to the group for a particular type of insurance;
   executing for each individual or family in the group and each of the available one or more insurance policies, an application configured to calculate uncovered costs associated with the second information based on characteristics of the individual or family, and calculating a total of the uncovered costs for the group, wherein the uncovered costs are costs separate from a premium of each of the available one or more insurance policies which are further not covered by any insurance policy;
   receiving third information from the user regarding the premium of each of the available one or more insurance policies for the group;
   receiving fourth information from the user regarding a rule for and type of fair sharing of a total of the premium and the uncovered costs between the group and a third party;
   processing, by a processor, the total of the uncovered costs, the third information, and the fourth information to produce the fair sharing of the total of the premium and the uncovered costs of insurance between the group and the third party; and
   delivering to the user payments by the group and by the third party that are consistent with the rule for fair sharing provided by the user.

2. The method of claim 1, wherein the insurance includes an instrument for risk management of an asset.

3. The method of claim 1, wherein the insurance includes at least one of health insurance, automobile insurance, life insurance, and long term care insurance.

4. The method of claim 1, wherein the uncovered costs are calculated utilizing a database.

5. The method of claim 1, wherein the rule for fair sharing indicates that the third party pay an equal percentage of the total of the premium and the uncovered costs for all of the one or more insurance policies available to the group.

6. The method of claim 1, wherein the rule for and the type of fair sharing are selected by the user from a catalog.

7. A computer program product embodied on a tangible computer readable medium, comprising:
   computer code for receiving census information from a user pertinent to a group insured by one or more insurance policies;
   computer code for receiving second information from the user describing attributes of one or more insurance policies available to the group for a particular type of insurance;
   computer code for executing for each individual or family in the group and each of the available one or more insurance policies, an application configured to calculate uncovered costs associated with the second information based on characteristics of the individual or family, and calculating a total of the uncovered costs for the group, wherein the uncovered costs are costs separate from a premium of each of the available one or more insurance policies which are further not covered by any insurance policy;

computer code for receiving third information from the user regarding the premium of each of the available one or more insurance policies for the group;

computer code for receiving fourth information from the user regarding a rule for and type of fair sharing of a total of the premium and the uncovered costs between the group and a third party;

computer code for processing the total of the uncovered costs, the third information, and the fourth information to produce the fair sharing of the total of the premium and the uncovered costs of insurance between the group and the third party; and computer code for delivering to the user payments by the group and by the third party that are consistent with the rule for fair sharing provided by the user.

8. The computer program product of claim 7, wherein the insurance includes an instrument for risk management of an asset.

9. The computer program product of claim 7, wherein the insurance includes at least one of health insurance, automobile insurance, life insurance, and long term care insurance.

10. The computer program product of claim 7, wherein the computer program product is operable such that the uncovered costs are calculated utilizing a database.

11. The method of claim 7, wherein the rule for fair sharing indicates that the third party pay an equal percentage of the total of the premium and the uncovered costs for all of the one or more insurance policies available to the group.

12. The computer program product of claim 7, wherein the computer program product is operable such that the rule for and the type of fair sharing are selected by the user from a catalog.

13. A system, comprising:
a processor configured to:
receive census information from a user pertinent to a group insured by one or more insurance policies;
receive second information from the user describing attributes of one or more insurance policies available to the group for a particular type of insurance;
execute for each individual or family in the group and each of the available one or more insurance policies, an application configured to calculate uncovered costs associated with the second information based on characteristics of the individual or family, and calculating a total of the uncovered costs for the group, wherein the uncovered costs are costs separate from a premium of each of the available one or more insurance policies which are further not covered by any insurance policy;
receive third information from the user regarding the premium of each of the available one or more insurance policies for the group;
receive fourth information from the user regarding a rule for and type of fair sharing of a total of the premium and the uncovered costs between the group and a third party;
process the total of the uncovered costs, the third information, and the fourth information to produce the fair sharing of the total of the premium and the uncovered costs of insurance between the group and the third party; and
deliver to the user payments by the group and by the third party that are consistent with the rule for fair sharing provided by the user.

14. The system of claim 13, wherein the insurance includes an instrument for risk management of an asset.

15. The system of claim 13, wherein the insurance includes at least one of health insurance, automobile insurance, life insurance, and long term care insurance.

16. The system of claim 13, wherein the system is operable such that the uncovered costs are calculated utilizing a database.

17. The system of claim 13, wherein the rule for fair sharing indicates that the third party pay an equal percentage of the total of the premium and the uncovered costs for all of the one or more insurance policies available to the group.

18. The system of claim 13, wherein the system is operable such that the rule for and the type of fair sharing are selected by the user from a catalog.

* * * * *